US012530536B2

(12) United States Patent
Chow et al.

(10) Patent No.: US 12,530,536 B2
(45) Date of Patent: Jan. 20, 2026

(54) MIXTURE-OF-EXPERT APPROACH TO REINFORCEMENT LEARNING-BASED DIALOGUE MANAGEMENT

(71) Applicant: Google LLC, Mountain View, CA (US)

(72) Inventors: Yinlam Chow, San Carlos, CA (US); Ofir Nachum, San Francisco, CA (US); Azamat Tulepbergenov, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 288 days.

(21) Appl. No.: 18/173,495

(22) Filed: Feb. 23, 2023

(65) Prior Publication Data

US 2023/0376697 A1    Nov. 23, 2023

Related U.S. Application Data

(60) Provisional application No. 63/343,766, filed on May 19, 2022.

(51) Int. Cl.
*G06F 40/35* (2020.01)
*G06F 40/126* (2020.01)
(Continued)

(52) U.S. Cl.
CPC ............ *G06F 40/35* (2020.01); *G06F 40/126* (2020.01); *G06N 3/092* (2023.01); *G06F 16/90332* (2019.01); *G06N 3/0455* (2023.01)

(58) Field of Classification Search
CPC ....... G06F 40/35; G06F 40/126; G06N 3/092; G06N 3/0455; G06N 3/047; G06N 3/0475;
(Continued)

(56) References Cited

U.S. PATENT DOCUMENTS 11,386,890 B1 *  7/2022  Fan .................... G06F 40/30
11,710,080 B2 *  7/2023  Zhang ............... G06Q 10/0639
                                                                  705/2

(Continued)

OTHER PUBLICATIONS

Ajay et al., "OPAL: Offline Primitive Discovery for Accelerating Offline Reinforcement Learning.", arXiv:2010.13611v3, May 4, 2021, 23 pages.

(Continued)

*Primary Examiner* — Hai Phan
*Assistant Examiner* — Nathan Tengbumroong
(74) *Attorney, Agent, or Firm* — DORITY & MANNING P.A.

(57) ABSTRACT

Systems and methods for dialogue response prediction can leverage a plurality of machine-learned language models to generate a plurality of candidate outputs, which can be processed by a dialogue management model to determine a predicted dialogue response. The plurality of machine-learned language models can include a plurality of experts trained on different intents, emotions, and/or tasks. The particular candidate output selected may be selected by the dialogue management model based on semantics determined based on a language representation. The language representation can be a representation generated by processing the conversation history of a conversation to determine conversation semantics.

21 Claims, 11 Drawing Sheets

(51) Int. Cl.
G06N 3/0455 (2023.01)
G06N 3/092 (2023.01)
G06F 16/9032 (2019.01)

(58) Field of Classification Search
CPC .......... G06N 3/084; G06N 3/09; G06N 3/044; G06N 3/006; G06N 7/01
See application file for complete search history.

(56) References Cited

U.S. PATENT DOCUMENTS

| | | |
|---|---|---|
| 2008/0052078 A1 | 2/2008 | Bennett |
| 2012/0016678 A1 | 1/2012 | Gruber et al. |
| 2015/0066479 A1 | 3/2015 | Pasupalak et al. |
| 2015/0178371 A1* | 6/2015 | Seth ..................... G06F 40/117 707/755 |
| 2018/0307745 A1* | 10/2018 | Bachrach ............... G06N 3/006 |
| 2018/0350349 A1 | 12/2018 | Liang et al. |
| 2020/0160176 A1* | 5/2020 | Mehrasa ................ G06N 3/047 |
| 2020/0175118 A1 | 6/2020 | Mahajan et al. |
| 2020/0218780 A1* | 7/2020 | Mei ......................... G06F 40/30 |
| 2021/0027770 A1* | 1/2021 | Olabiyi .................. G06N 3/045 |
| 2021/0083994 A1* | 3/2021 | Pan ................... G06F 18/23213 |
| 2021/0104231 A1* | 4/2021 | Jeon ......................... G10L 15/22 |
| 2021/0232773 A1* | 7/2021 | Wang ..................... G06F 18/21 |

OTHER PUBLICATIONS

Asadi et al., "Sample-efficient Deep Reinforcement Learning for Dialog Control.", arXiv:1612.06000v1, Dec. 18, 2016, 5 pages.
Bahl et al., "A Maximum Likelihood Approach to Continuous Speech Recognition.", Institute of Electrical and Electronics Engineers Transactions on Pattern Analysis and Machine Intelligence, vol. PAMI-5, No. 2, Mar. 1983, pp. 179-190.
Bodie et al., "The Role of "Active Listening." in Informal Helping Conversations: Impact on Perceptions of Listener Helpfulness, Sensitivity, and Supportiveness and Discloser Emotional Improvement", Western Journal of Communication, vol. 79, 2015, pp. 151-173.
Burgess et al., "Understanding disentangling in β-VAE.", arXiv:1804.03599v1, Apr. 10, 2018, 11 pages.
Cer et al., "Universal Sentence Encoder.", arXiv:1803.11175v2, Apr. 12, 2018, 7 pages.
Chen et al., "A Stable and Effective Learning Strategy for Trainable Greedy Decoding.", arXiv:1804.07915v2, Aug. 28, 2018, 11 pages.
Chien et al., "Markov Recurrent Neural Network Language Model.", 2019 Institute of Electrical and Electronics Engineers Automatic Speech Recognition and Understanding Workshop, Sentosa, Singapore, Dec. 14-18, 2019, pp. 807-813.
Danescu-Niculescu-Mizil et al., "Chameleons in Imagined Conversations: A New Approach to Understanding Coordination of Linguistic Style in Dialogs.", arXiv:1106.3077v1, Jun. 15, 2011, 12 pages.
Dathathri et al., "Plug and Play Language Models: A Simple Approach to Controlled Text Generation.", arXiv:1912.02164v4, Mar. 3, 2020, 34 pages.
Fatemi et al., "Policy Networks with Two-Stage Training for Dialogue Systems.", arXiv:1606.03152v4, Sep. 12, 2016, 10 pages.
Ficler et al., "Controlling Linguistic Style Aspects in Neural Language Generation.", arXiv:1707.02633v1, Jul. 9, 2017, 14 pages.
Floridi et al., "GPT-3: Its Nature, Scope, Limits, And Consequences" Minds & Machines., vol. 30, pp. 681-694.
Fujimoto et al., "Benchmarking Batch Deep Reinforcement Learning Algorithms.", arXiv:1910.01708v1, Oct. 3, 2019, 13 pages.
Fujimoto et al., "Off-Policy Deep Reinforcement Learning Without Exploration.", arXiv:1812.02900v3, Aug. 10, 2019, 23 pages.
Gasic et al., "On-Line Policy Optimisation of Spoken Dialogue Systems Via Live Interaction with Human Subjects.", 2011 Institute of Electrical and Electronics Engineers Workshop on Automatic Speech Recognition & Understanding, Waikoloa, Hawaii, United States, pp. 312-317.
Ghandeharioun et al., "Approximating Interactive Human Evaluation with Self-Play for Open-Domain Dialog Systems.", arXiv:1906.09308v2, Nov. 4, 2019, 20 pages.
Greensmith et al., "Variance Reduction Techniques for Gradient Estimates in Reinforcement Learning.", Journal of Machine Learning Research, vol. 5, Nov. 2004, pp. 1471-1530.
Gu et al., "Trainable Greedy Decoding for Neural Machine Translation.", arXiv:1702.02429v1, Feb. 8, 2017, 10 pages.
Hancock et al., "Learning from Dialogue after Deployment: Feed Yourself, Chatbot!", arXiv:1901.05415v4, Jun. 13, 2019, 18 pages.
Holtzman et al., "Learning to Write with Cooperative Discriminators.", arXiv:1805.06087v1, May 16, 2018, 17 pages.
Hurley et al., "Comparing Measures of Sparsity.", arXiv:0811.4706v2, Apr. 27, 2009, 16 pages.
International Search Report and Written Opinion for PCT/US23/21479, mailed on Aug. 15, 2023, 10 pages.
Jaques et al., "Way Off-Policy Batch Deep Reinforcement Learning of Implicit Human Preferences in Dialog.", arXiv:1907.00456v2, Jul. 8, 2019, 16 pages.
Kikuchi et al., "Controlling Output Length in Neural Encoder-Decoders.", arXiv:1609.09552v1, Sep. 30, 2016, 11 pages.
Kulkarni et al., "Hierarchical Deep Reinforcement Learning: Integrating Temporal Abstraction and Intrinsic Motivation.", arXiv:1604.06057v2, May 31, 2016, 14 pages.
Kumar et al., "Levine. Conservative Q-Learning for Offline Reinforcement Learning.", arXiv:2006.04779v3, Aug. 19, 2020, 31 pages.
Kumar et al., "Stabilizing Off-Policy Q-Learning via Bootstrapping Error Reduction", arXiv:1906.00949v2, Nov. 25, 2019, 19 pages.
Levin et al., "A Stochastic Model of Computer-Human Interaction for Learning Dialogue Strategies.", Institute of Electrical and Electronics Engineers Transactions on Speech and Audio Processing, vol. 8, No. 1, Jan. 2000, 13 pages.
Li et al., "A Diversity-Promoting Objective Function for Neural Conversation Models.", arXiv:1510.03055v5, Jun. 10, 2016, 11 pages.
Li et al., "Adversarial Learning for Neural Dialogue Generation.", arXiv:1701.06547v5, Sep. 24, 2017, 13 pages.
Li et al., "Deep Reinforcement Learning for Dialogue Generation.", arXiv:1606.01541v4, Sep. 29, 2016, 11 pages.
Li et al., "Dialogue Generation: From Imitation Learning to Inverse Reinforcement Learning.", arXiv:1812.03509v1, 8 pages.
Liao et al., "An Improved Aspect-Category Sentiment Analysis Model for Text Sentiment Analysis Based on Roberta.", Applied Intelligence, vol. 5, Issue 6, Jun. 2021, pp. 3522-3533.
Liu et al., "Dialogue Learning with Human Teaching and Feedback in End-to-End Trainable Task-Oriented Dialogue Systems.", arXiv:1804.06512v1, Apr. 18, 2018, 10 pages.
Oord et al., "Representation Learning with Contrastive Predictive Coding.", arXiv:1807.03748v2, Jan. 22, 2019, 13 pages.
Peng et al., "Few-Shot Natural Language Generation for Task-Oriented Dialog.", arXiv:2002.12328v1, Feb. 27, 2020, 12 pages.
Saleh et al., "Hierarchical Reinforcement Learning for Open-Domain Dialog.", arXiv:1909.07547v3, Dec. 31, 2019, 12 pages.
Schulman et al., "Equivalence Between Policy Gradients and Soft Q-Learning.", arXiv:1704.06440v4, Oct. 14, 2018, 15 pages.
Serban et al., "A Deep Reinforcement Learning Chatbot.", arXiv:1709.02349v2, Nov. 5, 2017, 40 pages.
Serban et al., "A Hierarchical Latent Variable Encoder-Decoder Model for Generating Dialogues", arXiv:1605.06069v3, 15 pages.
Serban et al., "Building End-To-End Dialogue Systems Using Generative Hierarchical Neural Network Models.", arXiv:1507.04808v3, Apr. 6, 2016, 8 pages.
Shah et al., "Bootstrapping a Neural Conversational Agent with Dialogue Self-Play, Crowdsourcing and On-Line Reinforcement Learning.", 2018 Conference of the North American Chapter of the Association for Computational Linguistics: Human Language Technologies, vol. 3 (Industry Papers), New Orleans, Louisiana, United States, Jun. 1-6, 2018, pp. 41-51.

(56) References Cited

OTHER PUBLICATIONS

Shi et al., "Sentiment Adaptive End-To-End Dialog Systems.", arXiv:1804.10731v3, Jul. 2, 2019, 12 pages.

Shin et al., "Generating Empathetic Responses by Looking Ahead the User's Sentiment.", arXiv:1906.08487v3, Dec. 28, 2021, 7 pages.

Shu et al., "Predictive Coding for Locally-Linear Control.", arXiv:2003.01086vl, Mar. 2, 2020, 18 pages.

Sidner et al., "Where to Look: A Study of Human-Robot Engagement.", Ninth International Conference on Intelligent User Interfaces, Jan. 2004, pp. 78-84.

Singh et al., "Optimizing Dialogue Management with Reinforcement Learning: Experiments with the NJFun System.", Journal of Artificial Intelligence Research, vol. 16, Feb. 2002, pp. 105-133.

Subramani et al., "Can Unconditional Language Models Recover Arbitrary Sentences?", arXiv:1907.04944v2, Jan. 9, 2020, 13 pages.

Sutskever et al., "Sequence to Sequence Learning with Neural Networks.", arXiv:1409.3215v3, Dec. 14, 2014, 9 pages.

Sutton et al., "Policy Gradient Methods for Reinforcement Learning with Function Approximation.", Advances in Neural Information Processing Systems (NIPS 1999), vol. 12, Denver, Colorado, United States, 7 pages.

Vaswani et al., "Attention is All You Need.", arXiv:1706.03762v5, Dec. 6, 2017, 15 pages.

Verma et al., "Chai: A Chatbot AI for Task-Oriented Dialogue with Offline Reinforcement Learning.", arXiv:2204.08426v1, Apr. 18, 2022, 21 pages.

Walker, "An Application of Reinforcement Learning to Dialogue Strategy Selection in a Spoken Dialogue System for Email.", arXiv:1106.0241v1, Jun. 1, 2011, 30 pages.

Wei et al., "AirDialogue: An Environment for Goal-Oriented Dialogue Research.", 2018 Conference on Empirical Methods in Natural Language Processing, Brussels, Belgium, Oct. 31-Nov. 4, 2018, pp. 3844-3854.

Williams, "Partially Observable Markov Decision Processes for Spoken Dialog Systems.", retrieved on May 1, 2023, chrome-extension://efaidnbmnnnibpcajpcglclefindmkaj/https://www.microsoft.com/en-us/research/wp-content/uploads/2016/02/williams2006thesis.pdf, Apr. 2006, 138 pages.

Wolf et al., "HuggingFace's Transformers: State-of-the-art Natural Language Processing.", arXiv:1910.03771v5, Jul. 14, 2020, 8 pages.

Wu et al., "Behavior Regularized Offline Reinforcement Learning.", arXiv:1911.11361v1, Nov. 26, 2019, 25 pages.

Young et al., "The Hidden Information State Model: A Practical Framework for POMDP-Based Spoken Dialogue Management.", Computer Speech & Language, vol. 24, Issue 2, Apr. 2010, pp. 150-174.

Zhang et al., "DialoGPT: Large-Scale Generative Pre-training for Conversational Response Generation.", arXiv:1911.00536v3, May 2, 2020, 10 pages.

Zhao et al., "Rethinking Action Spaces for Reinforcement Learning in End-to-end Dialog Agents with Latent Variable Models.", arXiv:1902.08858v2, Apr. 15, 2019, 12 pages.

Zhou et al., "The Design and Implementation of XiaoIce, An Empathetic Social Chatbot.", arXiv:1812.08989v2, Sep. 14, 2019, 35 pages.

Ziegler et al., "Fine-Tuning Language Models from Human Preferences.", arXiv:1909.08593v2, Jan. 8, 2020, 26 pages.

International Preliminary Report on Patentability for Application No. PCT/US2023/021479, mailed Nov. 28, 2024, 8 pages.

* cited by examiner

MIXTURE-OF-EXPERT APPROACH TO REINFORCEMENT LEARNING-BASED DIALOGUE MANAGEMENT

RELATED APPLICATIONS

This application claims priority to and the benefit of U.S. Provisional Patent Application No. 63/343,766, filed May 19, 2022. U.S. Provisional Patent Application No. 63/343,766 is hereby incorporated by reference in its entirety.

FIELD

The present disclosure relates generally to generating a dialogue response with a dialogue management model that selects a candidate response from a plurality of expert model outputs. More particularly, the present disclosure relates to obtaining a conversation history, processing the conversation history with a language encoding model, a plurality of expert language models, and a dialogue management model to generate a dialogue response.

BACKGROUND

Advancements in language models have included the generation of large language models with billions of learned parameters. Despite the large corpus of learned parameters, the language models can fail to properly generate responses with consideration of conversation history semantics. The language models can struggle with dialogue management and can struggle with the ability to carry on rich, engaging conversations. Additionally, the large language models can be computationally expensive for processing and retraining.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining input data. The input data can include conversation data descriptive of a conversation. The operations can include processing the input data with an encoder model to generate a language representation. In some implementations, the language representation can include a latent embedding associated with the conversation. The encoder model may have been trained to map an encoded conversation into a latent distribution. The operations can include processing the language representation with one or more machine-learned language models to generate one or more candidate outputs. The one or more candidate outputs can include one or more candidate utterances. The operations can include processing the one or more candidate outputs and the language representation with a dialogue management model to generate dialogue planning data. The operations can include generating a predicted dialogue response based on the dialogue planning data. In some implementations, the predicted dialogue response can include one or more predicted words associated with the one or more candidate utterances.

Another example aspect of the present disclosure is directed to a computer-implemented method. The method can include obtaining, by a computing system including one or more processors, conversation data. The conversation data can be descriptive of a conversation history. The method can include processing, by the computing system, the conversation data with a language encoding model to generate a language representation. The language representation can be descriptive of semantics associated with the conversation history. The method can include processing, by the computing system, the language representation with a plurality of machine-learned language models to generate a plurality of candidate outputs. The plurality of machine-learned language models may have been trained based on learned sentiment distributions associated with a latent space. The method can include processing, by the computing system, the language representation and the plurality of candidate outputs with a dialogue management model to determine a dialogue response.

Another example aspect of the present disclosure is directed to one or more non-transitory computer-readable media that collectively store instructions that, when executed by one or more computing devices, cause the one or more computing devices to perform operations. The operations can include obtaining training data. The training data can include training conversation data. The operations can include processing the training conversation data with a language encoding model to generate a language representation. The operations can include processing the language representation with a plurality of machine-learned language models to generate a plurality of candidate utterances. The operations can include processing the plurality of candidate utterances with a dialogue management model to determine a predicted dialogue response. The operations can include providing the predicted dialogue response to a user computing system and receiving additional conversation data from the user computing system. The additional conversation data can be descriptive of a conversation occurring after the predicted dialogue response. The operations can include adjusting one or more parameters of the dialogue management model based on the additional conversation data.

Another example aspect of the present disclosure is directed to a computing system. The system can include one or more processors and one or more non-transitory computer-readable media that collectively store instructions that, when executed by the one or more processors, cause the computing system to perform operations. The operations can include obtaining sequence data. The sequence data can be descriptive of a sequence. The operations can include processing the sequence data with an encoding model to generate an encoding representation. The encoding representation can be descriptive of determined semantics of the sequence. The operations can include processing the encoding representation with a plurality of machine-learned expert models to generate a plurality of candidate outputs. The plurality of machine-learned expert models can be associated with a plurality of different intents. The operations can include processing the plurality of candidate outputs and the encoding representation with a management model to generate planning data and generating a predicted output based on the planning data. The predicted output can include at least a portion of one or more candidate outputs of the plurality of candidate outputs.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
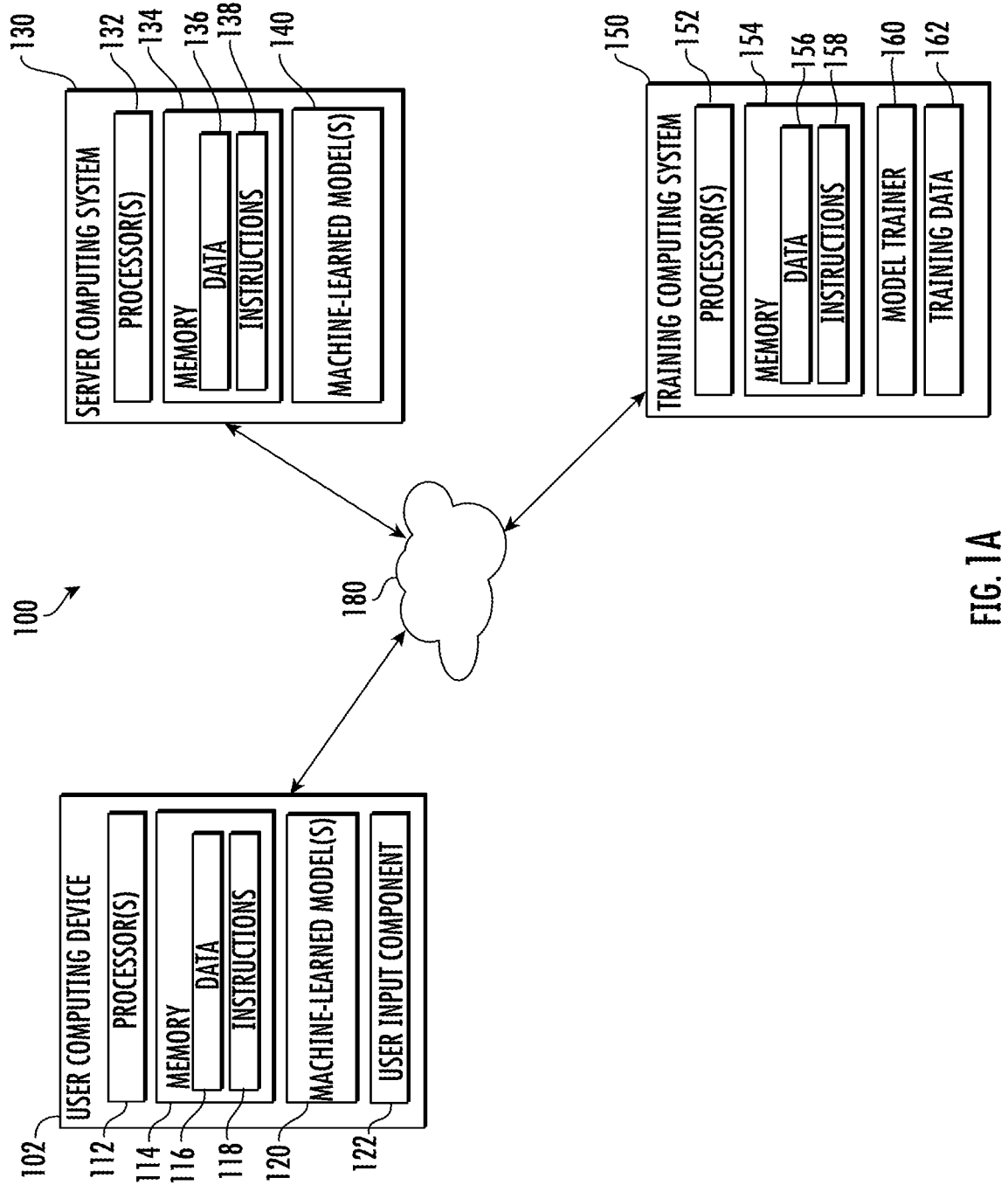
FIG. 1A depicts a block diagram of an example computing system that performs dialogue response prediction according to example embodiments of the present disclosure.

Reference numerals that are repeated across plural figures are intended to identify the same features in various implementations.

DETAILED DESCRIPTION

Overview

Generally, the present disclosure is directed to generating a dialogue response with a dialogue management model that selects a candidate response from a plurality of expert model outputs. More particularly, the present disclosure relates to obtaining a conversation history, processing the conversation history with a language encoding model, a plurality of expert language models, and a dialogue management model to generate a dialogue response. For example, the systems and methods can include obtaining input data. The input data can include a language representation. Alternatively and/or additionally, the input data can include conversation data descriptive of a conversation, and the conversation data can be processed by an encoder model (e.g., a language encoding model) to generate the language representation. In some implementations, the language representation can be associated with a conversation. The language representation can be processed with one or more machine-learned language models to generate one or more candidate outputs. The one or more candidate outputs can include one or more candidate utterances. The one or more candidate outputs and the language representation can be processed with a dialogue management model to generate dialogue planning data. In some implementations, a predicted dialogue response can be generated based on the dialogue planning data. The predicted dialogue response can include one or more predicted words associated with the one or more candidate utterances.

The systems and methods can obtain input data. The input data can include a language representation. Alternatively and/or additionally, the input data can include conversation data. The conversation data can be processed by an encoder model (e.g., a stochastic encoder that is trained to map an encoded conversation into a latent distribution) to generate the language representation. The language representation can be associated with a conversation. In some implementations, the language representation can be descriptive of semantics of a conversation history of the conversation. The conversation history can include a plurality of text strings exchanged. Additionally and/or alternatively, the language representation can be associated with a latent space distribution. In some implementations, the language representation may have been generated by processing the conversation history with a language encoding model.

The language representation can be processed with one or more machine-learned language models to generate one or more candidate outputs. The one or more candidate outputs can include one or more candidate utterances. In some implementations, the one or more machine-learned language models can include an expert language model trained on a particular skill such that the one or more candidate utterances may be indicative of the particular skill. Each of the one or more machine-learned language models may include a plurality of expert sub-models (and/or blocks) that may be trained for varying sentiments and/or tasks. Additionally and/or alternatively, the one or more machine-learned language models can generate a plurality of candidate utterance in which each candidate utterance is associated with one or more of the sentiments and/or tasks of the expert sub-models (and/or blocks (e.g., expert heads)).

In some implementations, processing the language representation with the one or more machine-learned language models to generate the one or more candidate outputs can include processing the language representation with a plurality of expert language models to generate a plurality of candidate outputs. The plurality of candidate outputs can be associated with a plurality of candidate utterances. In some implementations, the predicted dialogue response can include a selected candidate utterance associated with a selected candidate output of the plurality of candidate outputs. The selected candidate output can be selected by the dialogue management model.

The one or more candidate outputs and the language representation can be processed with a dialogue management model to generate dialogue planning data. The dialogue management model may have been trained with reinforcement learning. The reinforcement learning can optimize prediction for full conversations. In some implementations, the dialogue management model can be configured to determine a conversation intent based on the language representation and select a particular candidate output based on the particular candidate output being associated with the conversation intent. In some implementations, the reinforcement learning approach can include an offline reinforcement learning approach. Alternatively and/or additionally, the offline reinforcement learning approach can include conservative Q-learning (Kumar et al., Conservative q-learning for offline reinforcement learning, ADVANCES IN NEURAL INFORMATION PROCESSING SYSTEMS, 33: 1179-1191, 2020.). Conservative Q-learning can include a regularization scheme which learns a "conservative" Q-function that lower bounds the true Q-function.

A predicted dialogue response can then be generated based on the dialogue planning data. The predicted dialogue response can include one or more predicted words associated with the one or more candidate utterances. The predicted dialogue response can include a predicted utterance. In some implementations, the predicted utterance can be responsive to the input data.

Alternatively and/or additionally, the systems and methods can include obtaining conversation data. The conversation data can be descriptive of a conversation history. The conversation data can be processed with a language encoding model to generate a language representation. In some implementations, the language representation can be descriptive of semantics associated with the conversation history. The language representation can be processed with a plurality of machine-learned language models to generate a plurality of candidate outputs. In some implementations, the language representation and the plurality of candidate outputs can be processed with a dialogue management model to determine a dialogue response based on the plurality of candidate outputs.

In particular, the systems and methods can obtain conversation data. The conversation data can be descriptive of a conversation history.

The conversation data can be processed with a language encoding model to generate a language representation. The language representation can be descriptive of semantics associated with the conversation history. In some implementations, the language encoding model can include a stochastic encoder model. The stochastic encoder model can include an encoder and a latent space distribution. In some implementations, the stochastic encoder model can map a tokenized conversation history to a latent space to generate a parameterized gaussian distribution.

The language representation can be processed with a plurality of machine-learned language models to generate a plurality of candidate outputs. In some implementations, a first machine-learned language model of the plurality of machine-learned language models may have been trained for a first skill (e.g., a first intent), and a second machine-learned language model of the plurality of machine-learned language models may have been trained for a second skill (e.g., a second intent). Alternatively and/or additionally, the plurality of machine-learned language models can include a plurality of expert models associated with a plurality of emotions. In some implementations, the plurality of machine-learned language models can include a plurality of expert models associated with a plurality of tasks.

The language representation and the plurality of candidate outputs can be processed with a dialogue management model to determine a dialogue response based on the plurality of candidate outputs. The dialogue management model may be trained to select a particular candidate output of the plurality of candidate outputs based at least in part on the language representation. In some implementations, the plurality of machine-learned language models may be trained with ground truth training data.

For example, the systems and methods can include obtaining training data. The training data can include training conversation data descriptive of an example set of conversations.

The training conversation data can be processed with a language encoding model to generate a language representation. In some implementations, the language encoding model can include a variational autoencoder model. The language representation can include a sequence of embeddings.

The language representation can be processed with a plurality of machine-learned language models to generate a plurality of candidate utterances. The plurality of machine-learned language models can include a plurality of language decoder models.

The plurality of candidate utterances can be processed with a dialogue management model to determine a predicted dialogue response.

The predicted dialogue response can then be provided to a user computing system. The user computing system can be associated with a user involved in the conversation.

The systems and methods can then receive additional conversation data from the user computing system. The additional conversation data can be descriptive of a conversation occurring after the predicted dialogue response.

One or more parameters of the dialogue management model can be adjusted based on the additional conversation data.

In some implementations, the systems and methods can determine and/or generate satisfaction data based at least in part on the additional conversation data. The satisfaction data can be descriptive of a level of satisfaction with the predicted dialogue response. In some implementations, the satisfaction data can be determined based at least in part on conversation engagement. The systems and methods can then adjust one or more parameters of the dialogue management model based on the satisfaction data.

Additionally and/or alternatively, the training data can include one or more ground truth utterances. The systems and methods can then evaluate a loss function that evaluates a difference between a particular candidate utterance of the plurality of candidate utterances and the one or more ground truth utterances. One or more parameters of at least one of the plurality of machine-learned language models can be adjusted based at least in part on the loss function.

Although the present disclosure discusses the systems and methods as utilized for dialogue responses, the systems and methods disclosed herein can be generally applied to other tasks including other sequence processing tasks. For example, the systems and methods can include obtaining sequence data. The sequence data can be descriptive of a sequence. The sequence data can be processed with an encoding model to generate an encoding representation. In some implementations, the encoding representation can be descriptive of determined semantics of the sequence. The encoding representation can then be processed with a plurality of machine-learned expert models to generate a plurality of candidate outputs. In some implementations, the plurality of machine-learned expert models can be associated with a plurality of different intents. The systems and methods can include processing the plurality of candidate outputs and the encoding representation with a management model to generate planning data. A predicted output can then be generated based on the planning data. In some implementations, the predicted output can include at least a portion of one or more candidate outputs of the plurality of candidate outputs. In some implementations, the input sequence data can include waveform data (e.g., waveform data descriptive of audio such as speech), and the output may be generated waveform data responsive to the input waveform data. Alternatively and/or additionally, sequence data can include statistical sequences, waveform sequences, pixel sequences, and/or a variety of other sequences. Sequences can include the flow of conversations (spoken and/or via text), news feeds, numerical sequences, music sequences, light sequences, social media streams, and/or sensor data sequences.

The systems and methods can be utilized for chat bots, communication applications, help services, and/or search applications. For example, a user may input one or more messages, which can be processed by an encoder model to generate a language representation. The language representation can be descriptive of a task and/or a sentiment associated with the one or more messages. The language representation can be processed by one or more language models that can include a plurality of expert models (and/or machine-learned heads) to generate a plurality of candidate utterances. A dialogue management block can then process the language representation and the plurality of candidate utterances to generate a predicted dialogue response. The dialogue management block may determine one or more particular candidate utterances of the plurality of utterances to utilize based on a sentiment and/or task associated with the language representation (e.g., the language representation may be an embedding falling within a learned latent distribution associated with a particular sentiment and/or task). The candidate utterance may be based on one or more manually configured sentiment sequences (e.g., the dialogue management block may be configured to provide additional weight to an inquisitive candidate utterance once a threshold number of messages is received). Alternatively and/or additionally, the candidate utterance determination may be based on one or more sentiment sequences learned via training one or more parameters of a machine-learned model of the dialogue management block.

One or more machine-learned models may be trained via unsupervised and/or semi-supervised learning based on training and/or retraining based on conversations that meet one or more criteria. The one or more criteria can include an improvement in sentiment of messages received from a user. Additionally and/or alternatively, the one or more criteria can include a user performing a specific action (e.g., making a reservation, marking a service complete, purchasing an item, etc.).

In some implementations, background information associated with the user and/or a particular topic associated with a message may be obtained and utilized to generate the predicted dialogue response.

The one or more language models may include one or more generative models, which can include a transformer model and/or one or more autoregressive language models. In some implementations, the systems and methods can include end-to-end black box optimization.

The plurality of expert language models and/or the dialogue management model may be trained to provide natural conversationalist responses. The one or more machine-learned models may be trained for token by token utterance generation. Reinforcement learning can be utilized for conversation level determinations. Additionally and/or alternatively, the dialogue management model may be trained to provide empathetic utterance sequence patterns.

The systems and methods of the present disclosure provide a number of technical effects and benefits. As one example, the system and methods can be utilized to generate conversation history-aware automated dialogue responses. For example, the systems and methods can be trained and/or configured to process conversation history between at least two entities and generate semantically aware dialogue responses. Additionally, the use of the plurality of machine-learned expert language models can leverage a plurality of candidate responses associated with different emotions, intents, or tasks to provide the dialogue management model a plurality of options to consider when determining a dialogue response.

Another example technical effect and benefit can include leveraging a plurality of expert models and a management model to provide semantically-aware outputs without the computational costs of a large transformer model. In particular, the systems and methods disclosed herein can process sequence data to generate encoding data. The encoding data can be processed by the plurality of expert models to generate a plurality of candidate outputs associated with a plurality of different tasks and/or intents. The plurality of candidate outputs and the encoding representation can then be processed by a management model to determine one or more candidate outputs to be utilized for a predicted output. The predicted output can be based on the semantics of the sequence as determined based on the encoding representation. The use of the expert models in combination with the management model can mitigate the amount of parameters being retrained for each new context or meaning.

Another example technical effect and benefit relates to improved computational efficiency and improvements in the functioning of a computing system. For example, a technical benefit of the systems and methods of the present disclosure is the ability to reduce the computational resources needed for retraining and using one or more machine-learned language models. In particular, the systems and methods disclosed herein can generate conversation-aware dialogue responses without the heavy computational cost of a large language model. The systems and methods disclosed herein can allow for the focused training and/or retraining of expert language models and a dialogue management model without the computational cost of retraining billions of parameters. For example, instead of retraining the parameters of a large language model for each new semantic context, the systems and methods disclosed herein can leverage a plurality of expert models and a dialogue management model to generate semantically-aware dialogue response without computationally taxing retraining.

With reference now to the Figures, example embodiments of the present disclosure will be discussed in further detail.

Example Devices and Systems

FIG. 1A depicts a block diagram of an example computing system 100 that performs dialogue response prediction according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more mixture-of-experts language models 120. For example, the mixture-of-experts language models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example mixture-of-experts language models 120 are discussed with reference to FIGS. 2-4.

In some implementations, the one or more mixture-of-experts language models 120 can be received from the server computing system 130 over network 180, stored in the user computing device memory 114, and then used or otherwise implemented by the one or more processors 112. In some implementations, the user computing device 102 can implement multiple parallel instances of a single mixture-of-experts language model 120 (e.g., to perform parallel dialogue response predictions across multiple instances of conversation prompting).

More particularly, the mixture-of-experts language model can process conversation data (e.g., conversation data descriptive of conversation history) to generate a predicted dialogue response that is semantically-aware of the conversation history.

Additionally or alternatively, one or more mixture-of-experts language models 140 can be included in or otherwise stored and implemented by the server computing system 130 that communicates with the user computing device 102 according to a client-server relationship. For example, the mixture-of-experts language models 140 can be implemented by the server computing system 140 as a portion of a web service (e.g., a dialogue response prediction service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned mixture-of-experts language models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the mixture-of-experts language models 120 and/or 140 based on a set of training data 162. The training data 162 can include, for example, training conversation data (e.g., data descriptive of example conversation histories associated with differing semantics), ground truth utterances, and/or one or more ground truth labels.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
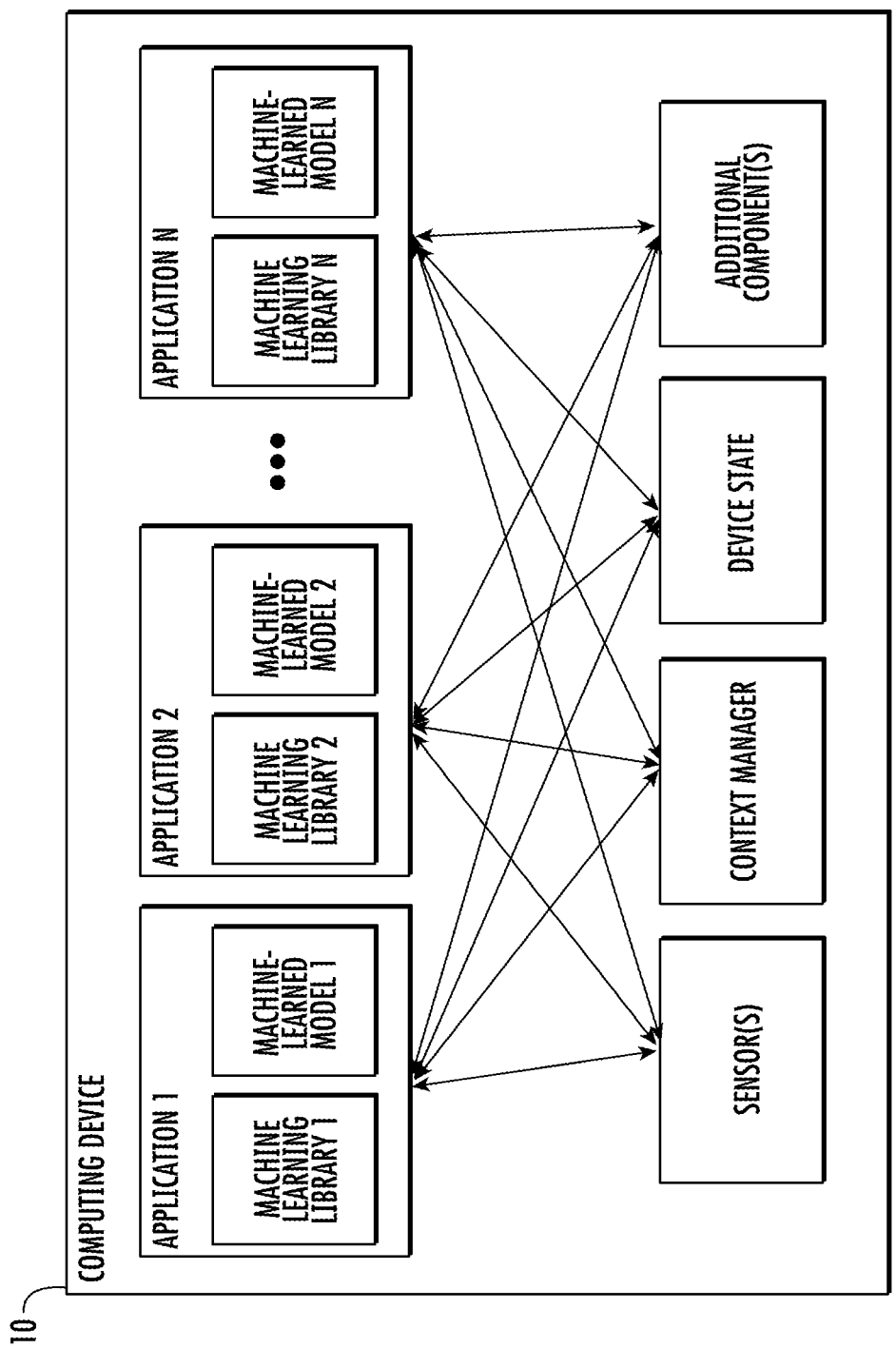
FIG. 1B depicts a block diagram of an example computing device that performs dialogue response prediction according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
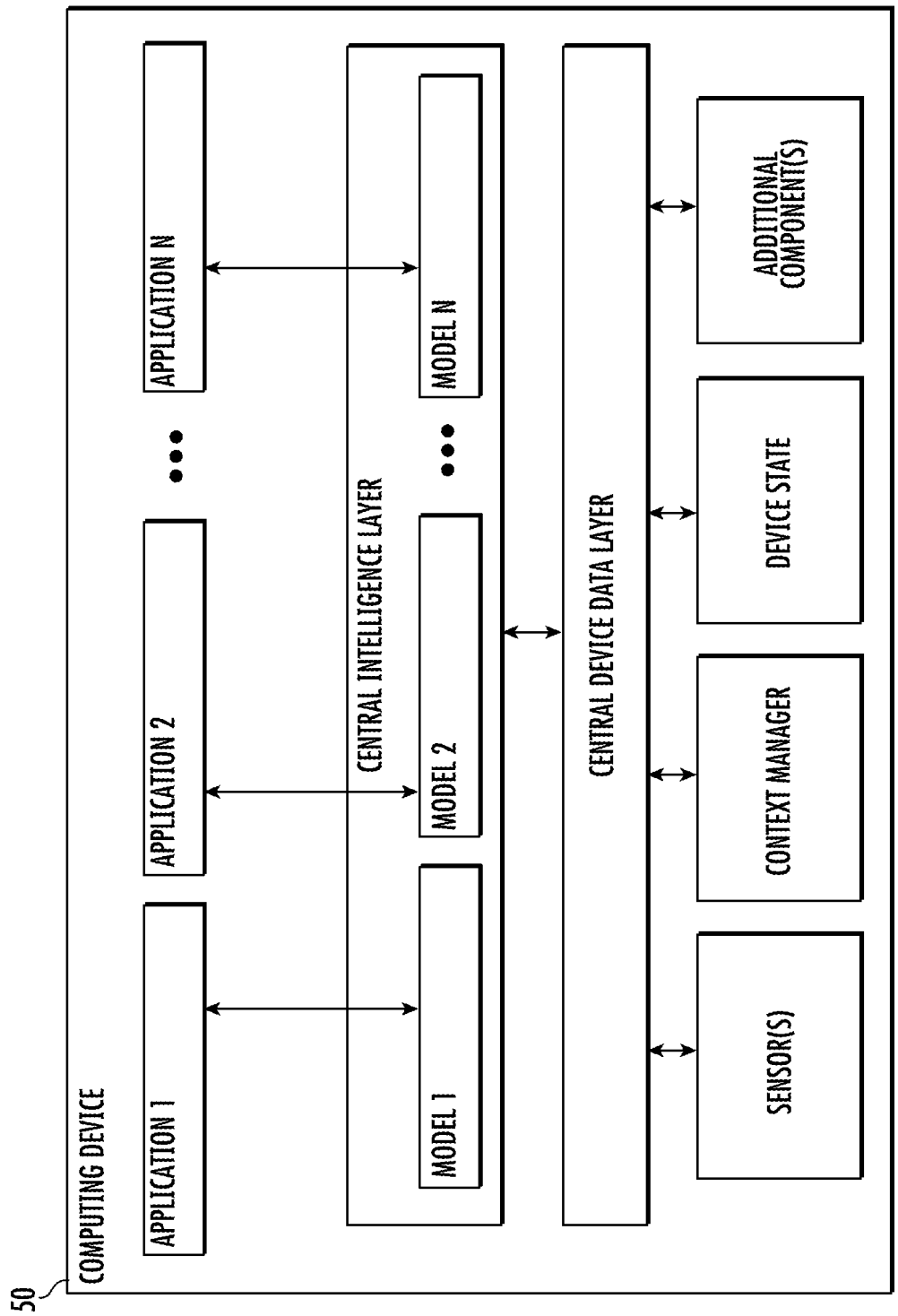
FIG. 1C depicts a block diagram of an example computing device that performs dialogue response prediction according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
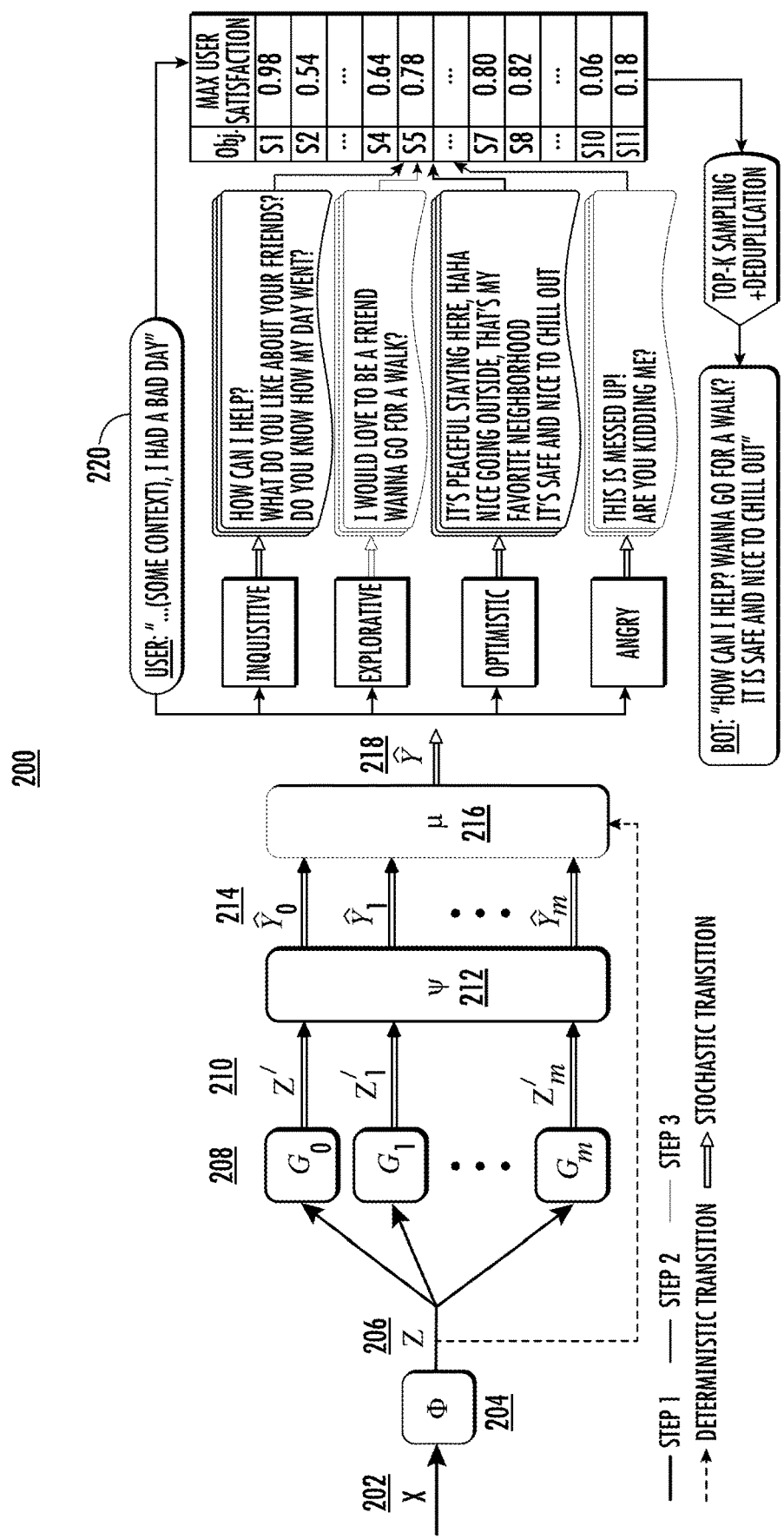
FIG. 2 depicts a block diagram of an example mixture-of-experts language model according to example embodiments of the present disclosure.

FIG. 2 depicts a block diagram of an example mixture-of-experts language model 200 according to example embodiments of the present disclosure. In particular, FIG. 2 depicts a tokenized conversation history 202 being processed by a stochastic encoder 204 that maps the tokenized conversation history 202 to a latent space. The mapped data can be utilized to construct a parameterized d-dimensional Gaussian distribution. The decoder model(s) can then generate a plurality of candidate utterances 214. The plurality of candidate utterances 214 can be associated with different emotions and/or different purposes. From the plurality of candidate utterances 214, a predicted utterance 218 can be selected by the dialogue management model 216. The selection may be based on a predicted satisfaction score for each candidate utterance. In some implementations, the predicted utterance 218 can include one or more of the candidate utterances.

For example, conversation data descriptive of a conversation history 202 can be obtained. The conversation history 202 can include one or more messages associated with one or more sentiments. The conversation history can be processed with an encoder model (e.g., a stochastic encoder 204) to generate a language representation 206 descriptive of a latent embedding of the conversation history. A plurality of gaussian distributions 208 can then be sampled (and/or utilized) to generate a plurality of sampled embeddings 210 associated with a plurality of learned distributions that may be associated with a plurality of different sentiments. The plurality of sampled embeddings 210 and/or the language representation 206 can then be decoded with a decoder model 212 to generate a plurality of candidate utterances 214, which may be associated with a plurality of candidate utterances responsive to at least one message of the conversation history 202. The plurality of candidate utterances 214 and the language representation 206 can then be processed with the dialogue management model 216 to generate and/or determine a predicted utterance 218 to utilize in responding.

An example pipeline 220 can include obtaining a message from a user. The message can be encoded and then processed by a plurality of expert language models and/or a plurality of expert heads of a large language model to generate a plurality of candidate utterances responsive to the message. The different expert language models may be associated with different sentiments, which can include "inquisitive" (e.g., a language model trained to ask direct and/or specific questions), "explorative" (e.g., a language model trained to explore options and/or ask general questions), "optimistic", and/or "angry". The plurality of candidate utterances and the language representation can be processed with a dialogue management model, which can determine a candidate utterance to use based on one or more learned sequences that lead to satisfaction. In some implementations, the dialogue management model may utilize a subset of the plurality of candidate utterances and may order the selected utterances based on one or more learned sequences associated with a determined sentiment of the user input message.

Figure 3:
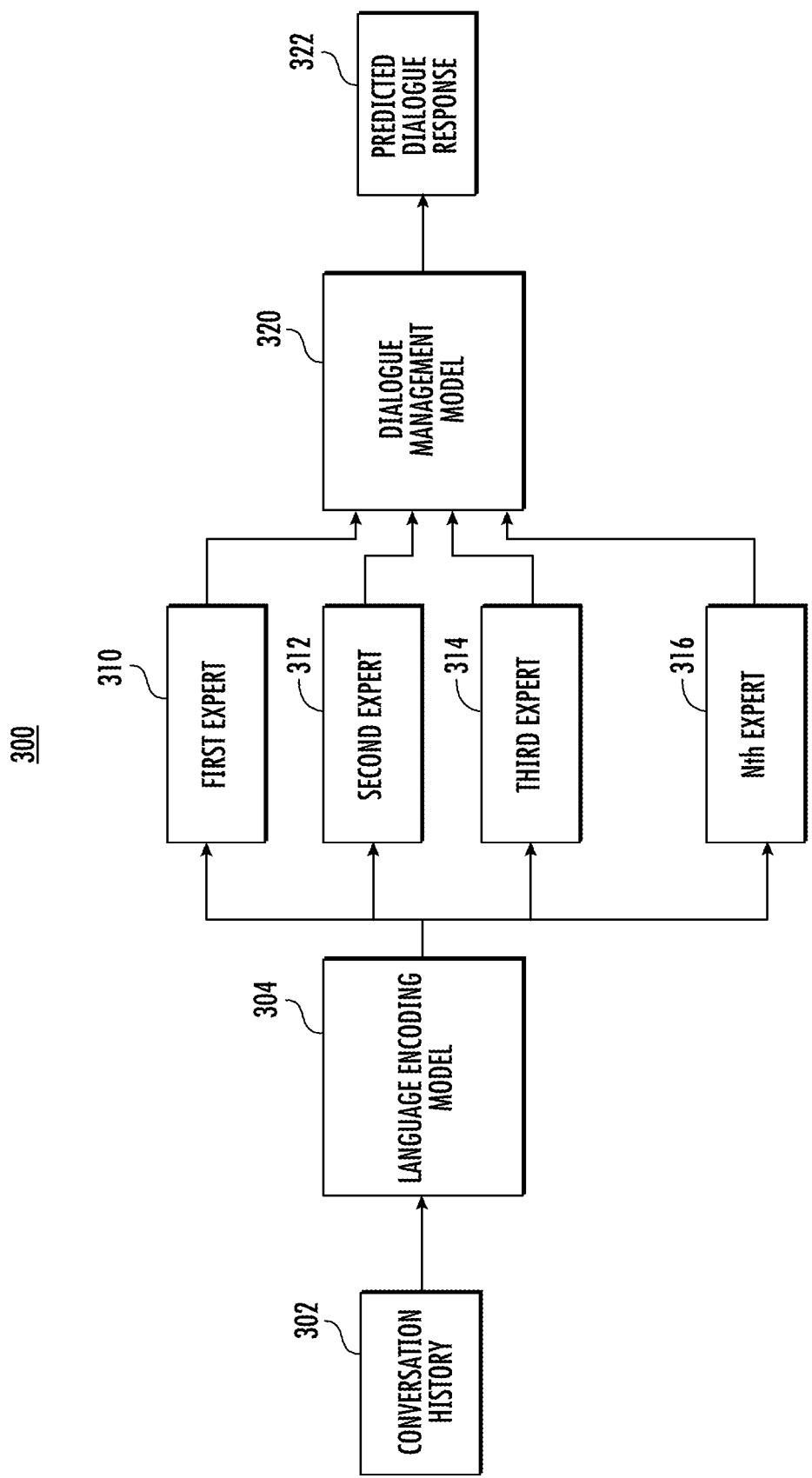
FIG. 3 depicts a block diagram of an example mixture-of-experts language model according to example embodiments of the present disclosure.

FIG. 3 depicts a block diagram of an example mixture-of-experts language model 300 according to example embodiments of the present disclosure. In particular, the mixture-of-experts model 300 can process conversation history data 302 to generate a predicted dialogue response 322. For example, the conversation history 302 can be processed by a language encoding model 304 to generate a latent representation, which can then be processed by a plurality of expert models (e.g., 310, 312, 314, and/or 316) to generate a plurality of candidate outputs. The plurality of candidate outputs can then be processed with a dialogue management model 320 to generate the predicted dialogue response 322.

The conversation history 302 may be recurrently embedded throughout a communication sequence between a user and a chat bot. The conversation history 302 may be processed by one or more encoder models (e.g., one or more latent encoding models 304) to generate a language representation associated with an embedding in a latent space. For example, the encoder model may be trained to map the conversation history to a latent space that includes a plurality of learned latent distributions associated with a plurality of sentiments and/or a plurality of tasks.

The language representation can then be processed with a plurality of experts (e.g., a plurality of expert language models, a plurality of expert heads of a large language model, and/or a plurality of sampled expert embeddings associated with a plurality of learned distributions) to generate a plurality of candidate utterances. For example, the language representation can be processed with a first expert block 310 (e.g., an expert language model trained on training examples sampled from a first learned distribution (e.g., an embedding distribution associated with inquisitive responses)) to generate a first candidate utterance. Additionally and/or alternatively, the language representation can be processed with a second expert block 312 (e.g., an expert language model trained on training examples sampled from a second learned distribution (e.g., an embedding distribution associated with explorative responses)) to generate a second candidate utterance. The language representation can be processed with a third expert block 314 (e.g., an expert language model trained on training examples sampled from a third learned distribution (e.g., an embedding distribution associated with optimistic responses)) to generate a third candidate utterance. In some implementations, the language representation can be processed with an nth expert block 316 (e.g., an expert language model trained on training examples sampled from an nth learned distribution (e.g., an embedding distribution associated with de-escalating responses)) to generate an nth candidate utterance.

The plurality of candidate utterances including the first candidate utterance, the second candidate utterance, the third candidate utterance, and the nth candidate utterance can be processed with the dialogue management model 320 to generate a predicted dialogue response 322. The predicted dialogue response 322 can include one or more selected candidate utterances of the plurality of candidate utterances. The predicted dialogue response 322 may be generated based on one or more learned parameters of the dialogue management model 320 trained based on one or more sequences and/or objectives. The dialogue management model 320 may be tuned based on reinforcement learning.

Figure 4:
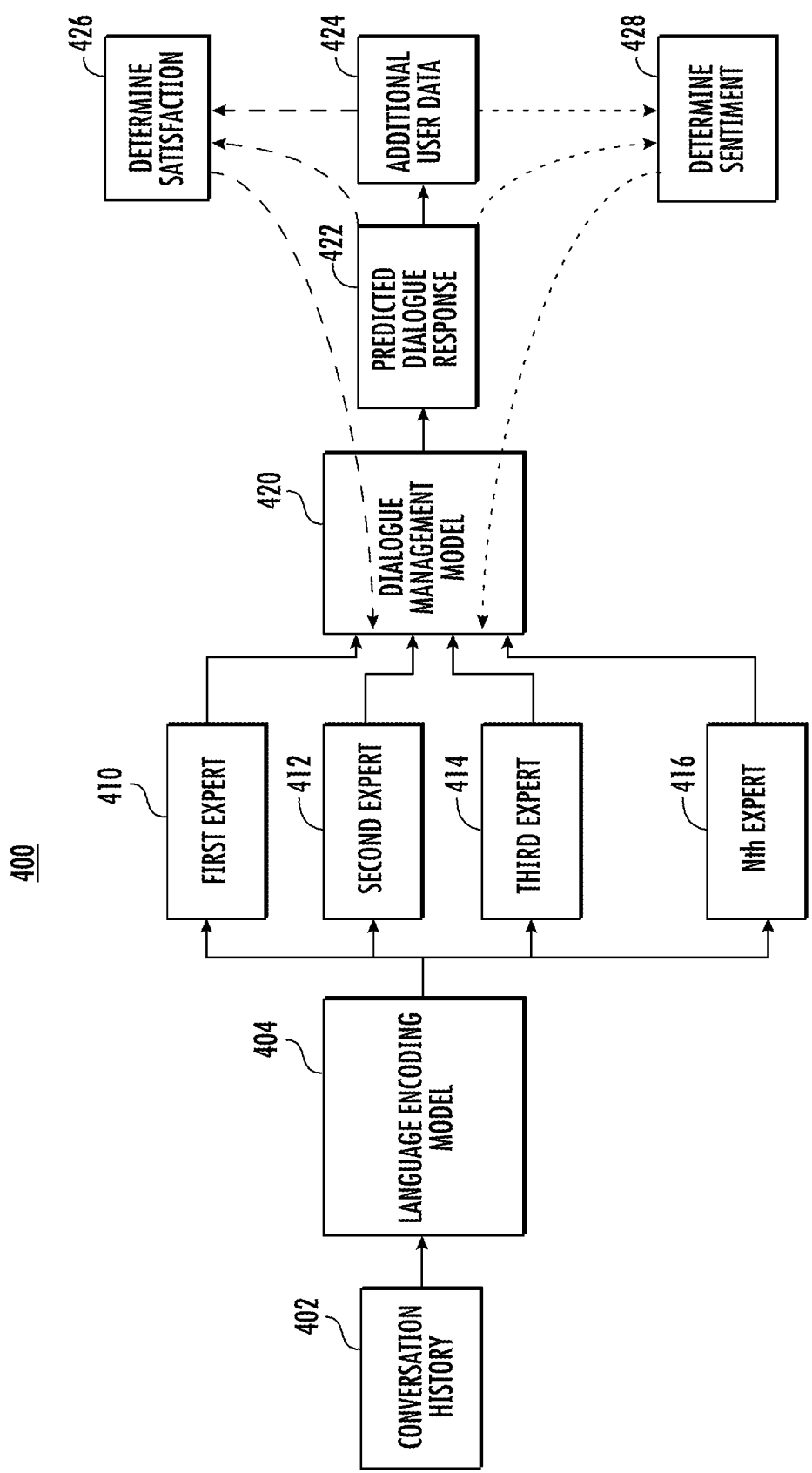
FIG. 4 depicts a block diagram of an example language model training according to example embodiments of the present disclosure.

FIG. 4 depicts a block diagram of an example language model training 400 according to example embodiments of the present disclosure. In particular, the mixture-of-experts model can be trained to process conversation history data to generate a predicted dialogue response 422 that is semantically-aware. For example, the conversation history 402 can be processed by a language encoding model 404 to generate a latent representation, which can then be processed by a plurality of expert models (e.g., 410, 412, 414, and/or 416) to generate a plurality of candidate outputs. The plurality of candidate outputs can then be processed with a dialogue management model 420 to generate the predicted dialogue response 422. The predicted dialogue response 422 can be processed to determine satisfaction data 426 (e.g., a determined satisfaction level based on engagement following the predicted dialogue response being provided) and/or sentiment data 428 (e.g., data descriptive of whether the sentiment of the predicted dialogue response is associated with the sentiment of the conversation history). One or more parameters of the dialogue management model 420 can then be adjusted based on the satisfaction data and/or the sentiment data.

The conversation history 402 may be recurrently embedded throughout a communication sequence between a user and a chat bot. The conversation history 402 may be processed by one or more encoder models (e.g., one or more latent encoding models 404) to generate a language representation associated with an embedding in a latent space. For example, the encoder model may be trained to map the conversation history to a latent space that includes a plurality of learned latent distributions associated with a plurality of sentiments and/or a plurality of tasks.

The language representation can then be processed with a plurality of experts (e.g., a plurality of expert language models, a plurality of expert heads of a large language model, and/or a plurality of sampled expert embeddings associated with a plurality of learned distributions) to generate a plurality of candidate utterances. For example, the language representation can be processed with a first expert block 410 (e.g., an expert language model trained on training examples sampled from a first learned distribution) to generate a first candidate utterance. Additionally and/or alternatively, the language representation can be processed with a second expert block 412 (e.g., an expert language model trained on training examples sampled from a second learned distribution) to generate a second candidate utterance. The language representation can be processed with a third expert block 414 (e.g., an expert language model trained on training examples sampled from a third learned distribution) to generate a third candidate utterance. In some implementations, the language representation can be processed with an nth expert block 416 (e.g., an expert language model trained on training examples sampled from an nth learned distribution) to generate an nth candidate utterance.

The plurality of candidate utterances including the first candidate utterance, the second candidate utterance, the third candidate utterance, and the nth candidate utterance can be processed with the dialogue management model 420 to generate a predicted dialogue response 422. The predicted dialogue response 422 can include one or more selected candidate utterances of the plurality of candidate utterances.

Additional user data 424 (e.g., one or more additional messages that respond to the provided predicted dialogue response 422 and/or data associated with user performed actions following the predicted dialogue response 422 being provided) can be obtained. The additional user data 424 may include an updated conversation history embedding and/or an embedding associated with a follow-up message from the user. One or more parameters of the dialogue management model 420 may be adjusted based on the additional user data 424 and/or the predicted dialogue response 422. For example, satisfaction data 426 (e.g., a determined satisfaction level based on engagement following the predicted dialogue response being provided) and/or sentiment data 428 (e.g., data descriptive of whether the sentiment of the predicted dialogue response is associated with the sentiment of the conversation history) can be determined and/or generated based on the additional user data 424 and/or the predicted dialogue response 422. The satisfaction data 426 may be determined based on the user performing one or more desired actions associated with one or more goals of a task. For example, a user making a reservation and/or purchase, concluding a conversation, closing a help ticket, and/or providing an end message. A loss function (e.g., a first loss function) may be evaluated that incentivizes a goal being completed and/or penalizes a determined regression (e.g., a user repeating a comment and/or question). The sentiment data 428 can be determined based on encoding the additional user data 424 to map the additional user input to the latent space. The sentiment data 428 may be descriptive of the embedding being associated with a particular sentiment distribution of the latent space. A loss function (e.g., a second loss function) may be evaluated that incentivizes an improvement of sentiment and/or a sentiment that matches a desired sequence and/or penalizes a negative sentiment change and/or a deviance from a desired sequence. One or more parameters of the dialogue management model 420 may be adjusted based on one or more gradient descents generated by evaluating one or more loss functions evaluated based on the predicted dialogue response 422, the conversation history 402, the satisfaction data 426, the sentiment data 428, and/or the additional user data 424.

Figure 5:
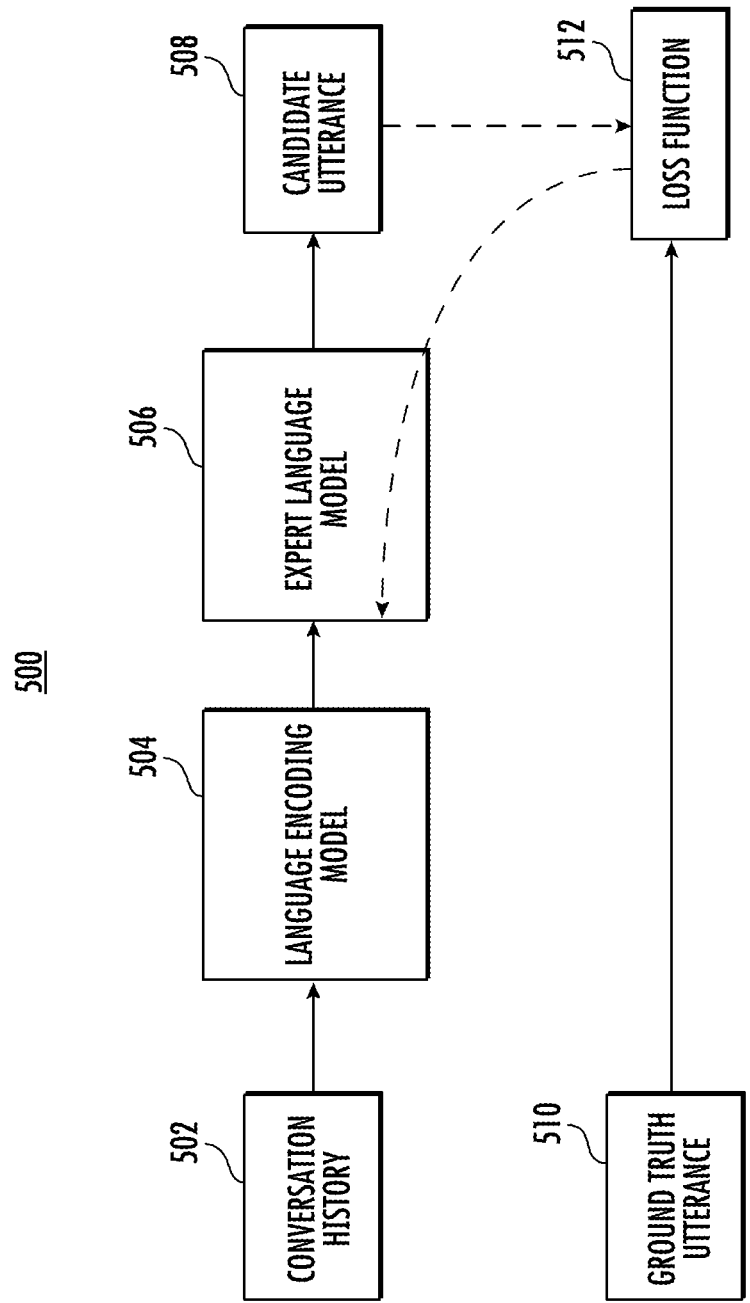
FIG. 5 depicts a block diagram of an example expert language model training according to example embodiments of the present disclosure.

FIG. 5 depicts a block diagram of an example expert language model training 500 according to example embodiments of the present disclosure. In particular, expert language model training 500 can include processing the conversation history 502 with a language encoding model 504 and an expert language model 506 to generate a candidate utterance 508. The candidate utterance 508 can then be compared to a ground truth utterance 510 in order to evaluate a loss function 512. One or more parameters of the expert language model 506 can then be adjusted based on the loss function 512.

For example, a plurality of example conversation history 502 (and/or a training language representation) and ground truth utterance 510 training pairs may be utilized to train one or more expert language models 506 and/or one or more language encoding models 504. In some implementations, the language encoding model 504 may be pretrained and/or trained separately. The language encoding model 504 may be trained to map conversation data to an embedding space. One or more sentiment distributions and/or one or more task distributions of the latent embedding space may be learned by sampling embeddings from the embedding space and then classifying the output of processing the sampled embeddings. Based on the learned distributions, each of the expert language models of a plurality of expert language models may be trained by selecting training examples from a specific learned distribution to generate an expert associated with that particular learned distribution.

The conversation history 502 and the ground truth utterance 510 may be associated with an embedding in a learned distribution associated with an assigned sentiment and/or task for the expert language model 506. For training, the conversation history 502 can be processed with the language encoding model 504 to generate a language representation. The language representation can then be processed with the expert language model 506 to generate a candidate utterance 508. The candidate utterance 508 and the ground truth utterance 510 can be utilized to evaluate a loss function 512 to generate a gradient descent. The gradient descent can then be backpropagated to the expert language model 506 to adjust one or more parameters of the expert language model 506. The candidate utterance 508 may be descriptive of a predicted candidate response to one or more user messages of the conversation history 502. The candidate utterance 508 may include a text string. The ground truth utterance 510 may include a text string that is responsive to one or more messages of the conversation history 502.

Example Methods

Figure 6:
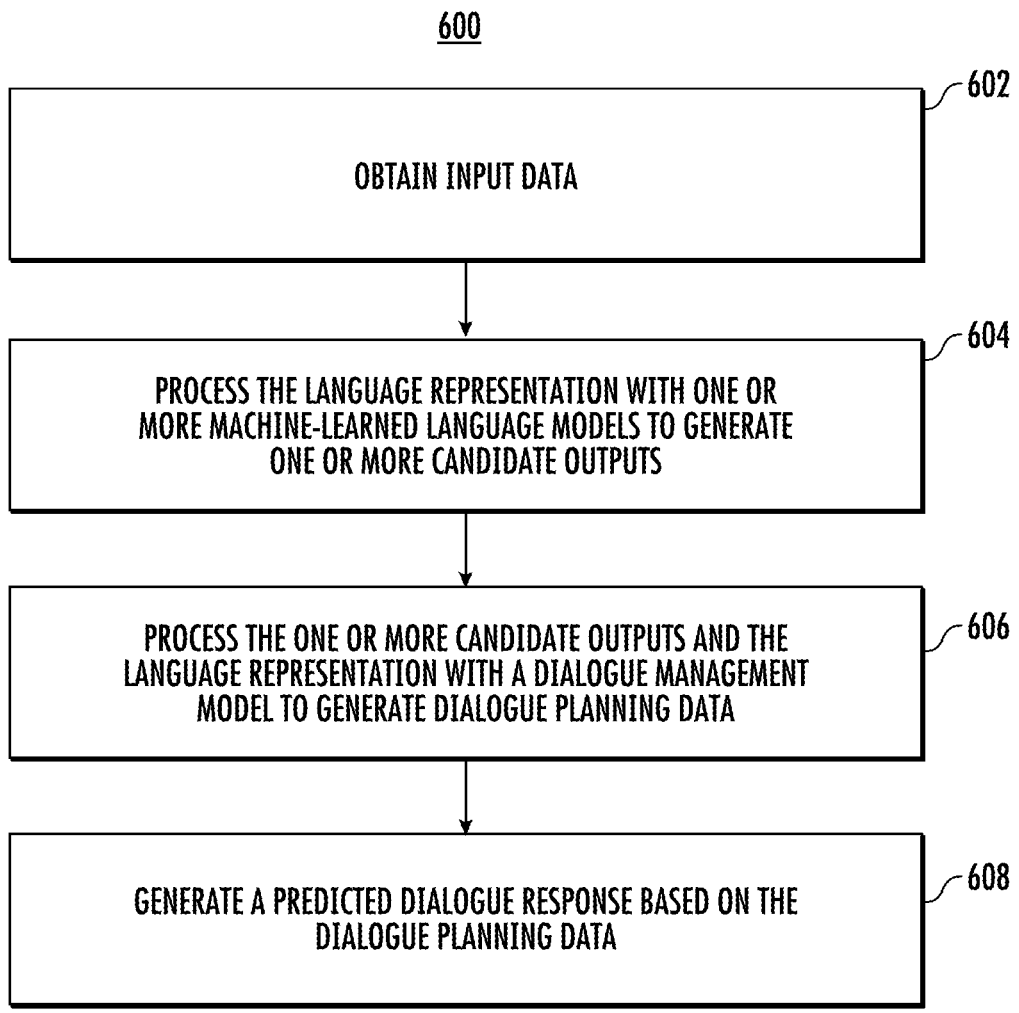
FIG. 6 depicts a flow chart diagram of an example method to perform dialogue response prediction according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain input data. The input data can include a language representation. The language representation can be associated with a conversation. In some implementations, the language representation can be descriptive of semantics of a conversation history of the conversation. The conversation history can include a plurality of text strings exchanged. Additionally and/or alternatively, the language representation can be associated with a latent space distribution of a latent space. In some implementations, the language representation may have been generated by processing the conversation history with a language encoding model. The language representation may be associated with a learned distribution of a latent space, and the learned distribution may be associated with a particular sentiment.

In some implementations, the input data can include conversation data descriptive of a conversation (e.g., conversation data descriptive of a conversation history that can include a sequence of responses). The conversation data (i.e., the input data) can be processed with an encoder model to generate a language representation. The language representation can include a latent embedding associated with the conversation. The encoder model may have been trained to map an encoded conversation into a latent distribution.

At 604, the computing system can process the language representation with one or more machine-learned language models to generate one or more candidate outputs. The one or more candidate outputs can include one or more candidate utterances. In some implementations, the one or more machine-learned language models can include an expert language model trained on a particular skill such that the one or more candidate utterances may be indicative of the particular skill.

In some implementations, processing the language representation with the one or more machine-learned language models to generate the one or more candidate outputs can include processing the language representation with a plurality of expert language models to generate a plurality of candidate outputs. The plurality of candidate outputs can be associated with a plurality of candidate utterances. In some implementations, the predicted dialogue response can include a selected candidate utterance associated with a selected candidate output of the plurality of candidate outputs. The selected candidate output can be selected by the dialogue management model.

At 606, the computing system can process the one or more candidate outputs and the language representation with a dialogue management model to generate dialogue planning data. The dialogue management model may have been trained with reinforcement learning. The reinforcement learning can optimize prediction for full conversations. In some implementations, the dialogue management model can be configured to determine a conversation intent based on the language representation and select a particular candidate output based on the particular candidate output being associated with the conversation intent.

At 608, the computing system can generate a predicted dialogue response based on the dialogue planning data. The predicted dialogue response can include one or more predicted words associated with the one or more candidate utterances. The predicted dialogue response can include a predicted utterance. In some implementations, the predicted utterance can be responsive to the input data.

Figure 7:
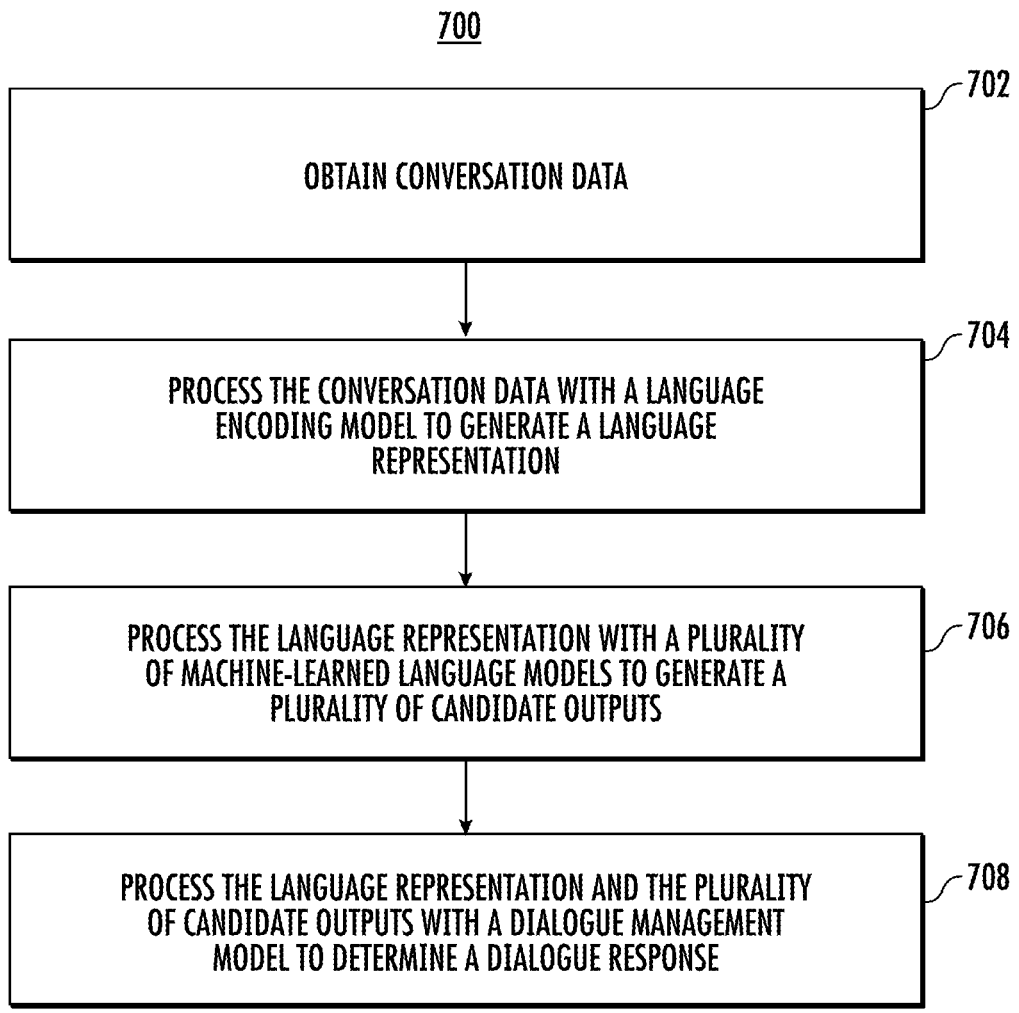
FIG. 7 depicts a flow chart diagram of an example method to perform dialogue response prediction according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain conversation data. The conversation data can be descriptive of a conversation history.

At 704, the computing system can process the conversation data with a language encoding model to generate a language representation. The language representation can be descriptive of semantics associated with the conversation history. In some implementations, the language encoding model can include a stochastic encoder model. The stochastic encoder model can include an encoder and a latent space distribution. In some implementations, the stochastic encoder model can map a tokenized conversation history to a latent space to generate a parameterized gaussian distribution.

At 706, the computing system can process the language representation with a plurality of machine-learned language models to generate a plurality of candidate outputs. In some implementations, a first machine-learned language model of the plurality of machine-learned language models may have been trained for a first skill (e.g., a first intent or first emotion), and a second machine-learned language model of the plurality of machine-learned language models may have been trained for a second skill (e.g., a second intent or second emotion). Alternatively and/or additionally, the plurality of machine-learned language models can include a plurality of expert models associated with a plurality of emotions. In some implementations, the plurality of machine-learned language models can include a plurality of expert models associated with a plurality of tasks. Additionally and/or alternatively, the plurality of machine-learned language models may have been trained based on learned sentiment distributions associated with a latent space.

At 708, the computing system can process the language representation and the plurality of candidate outputs with a dialogue management model to determine a dialogue response. The dialogue management model may be trained to select a particular candidate output of the plurality of candidate outputs based at least in part on the language representation. In some implementations, the plurality of machine-learned language models may be trained with ground truth training data.

Figure 8:
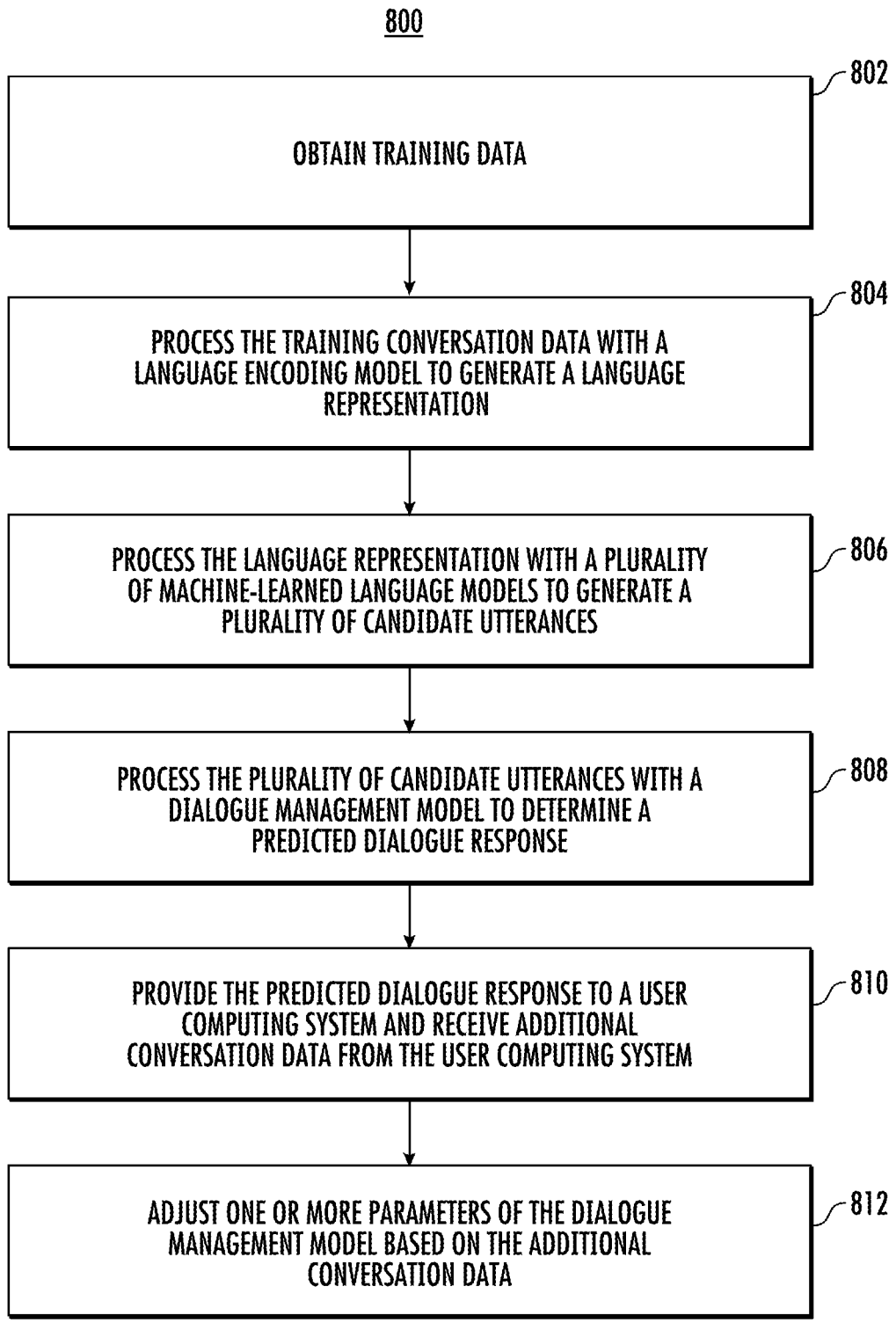
FIG. 8 depicts a flow chart diagram of an example method to perform language model training according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain training data. The training data can include training conversation data descriptive of an example set of conversations.

At 804, the computing system can process the training conversation data with a language encoding model to generate a language representation. In some implementations, the language encoding model can include a variational autoencoder model. The language representation can include a sequence of embeddings.

At 806, the computing system can process the language representation with a plurality of machine-learned language models to generate a plurality of candidate utterances. The plurality of machine-learned language models can include a plurality of language decoder models.

At 808, the computing system can process the plurality of candidate utterances with a dialogue management model to determine a predicted dialogue response.

At 810, the computing system can provide the predicted dialogue response to a user computing system and receive additional conversation data from the user computing system. The user computing system can be associated with a user involved in the conversation. The additional conversation data can be descriptive of a conversation occurring after the predicted dialogue response.

At 812, the computing system can adjust one or more parameters of the dialogue management model based on the additional conversation data.

In some implementations, the computing system can determine and/or generate satisfaction data based at least in part on the additional conversation data. The satisfaction data can be descriptive of a level of satisfaction with the predicted dialogue response. In some implementations, the satisfaction data can be determined based at least in part on conversation engagement. The computing system can then adjust one or more parameters of the dialogue management model based on the satisfaction data.

Additionally and/or alternatively, the training data can include one or more ground truth utterances. The computing system can then evaluate a loss function that evaluates a difference between a particular candidate utterance of the plurality of candidate utterances and the one or more ground truth utterances. One or more parameters of at least one of the plurality of machine-learned language models can be adjusted based at least in part on the loss function.

Figure 9:
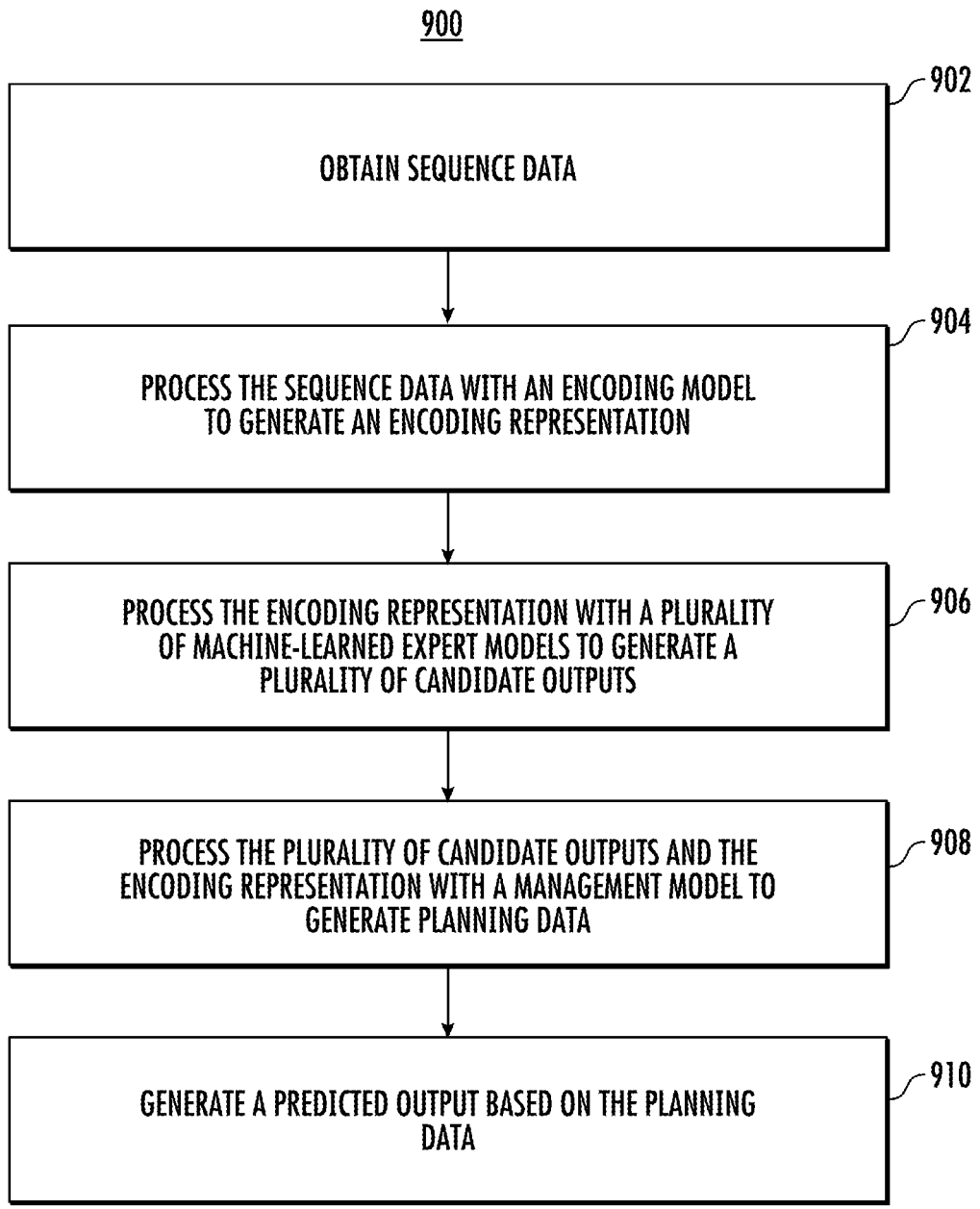
FIG. 9 depicts a flow chart diagram of an example method to perform sequence training according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can obtain sequence data. The sequence data can be descriptive of a sequence. For example, the sequence data can be descriptive of a sequence of conversational text strings and/or a sequence of sentiment associated with a conversation.

At 904, the computing system can process the sequence data with an encoding model to generate an encoding representation. The encoding representation can be descriptive of determined semantics of the sequence.

At 906, the computing system can process the encoding representation with a plurality of machine-learned expert models to generate a plurality of candidate outputs. The plurality of machine-learned expert models can be associated with a plurality of different intents.

At 908, the computing system can process the plurality of candidate outputs and the encoding representation with a management model to generate planning data.

At 910, the computing system can generate a predicted output based on the planning data. The predicted output can include at least a portion of one or more candidate outputs of the plurality of candidate outputs.

Example Implementations and Example Experiments

Despite recent advancements in language models (LMs), their application to dialogue management (DM) problems and ability to carry on rich conversations remain a challenge. The systems and methods disclosed herein can utilize reinforcement learning (RL) to develop a dialogue agent that can avoid being short-sighted (e.g., outputting generic utterances) and can maximize overall user satisfaction. Most existing RL approaches to DM train the agent at the word-level, and thus, have to deal with a combinatorially complex action space even for a medium-size vocabulary. As a result, they can struggle to produce a successful and engaging dialogue even if they are warm-started with a pre-trained LM. A RL-based DM can utilize a novel mixture of expert language model (MoE-LM) that includes (i) a LM capable of learning diverse semantics for conversation histories, (ii) a number of specialized LMs (or experts) capable of generating utterances corresponding to a particular attribute or personality, and (iii) a RL-based DM that performs dialogue planning with the utterances generated by the experts. The mixture of experts approach can provide greater flexibility to generate sensible utterances with different intents and can allow RL to focus on conversational-level DM.

With the advancements in natural language understanding and generation, increasing attention has been directed to construct intelligent dialogue agents that can carry out rich and engaging conversations with human users. The interactions can be open-ended, can include a plurality of different topics, and can involve an underlying task (e.g., building a rapport, negotiation, information exchange, and/or recommendation). Therefore, to satisfy the user, a good dialogue agent may not only generate natural responses, but may also be capable of pursuing the task's objectives and adapting to the user's feedback on-the-fly.

A standard solution may be to train the dialogue agent using behavioral cloning, where the agent is a language model (LM) that imitates the utterances in the training set. By leveraging deep neural networks (e.g., RNNs and/or Transformers), a LM can encode the conversation to a low-dimensional dialogue state and can predict an utterance.

Dialogue management (DM) may be viewed as a control problem and may use reinforcement learning (RL) to optimize the agent's policy (which can be a language model).

The systems and methods can include an RL-based DM agent using a novel mixture of expert (MoE) approach. The mixture of experts approach can utilize a mixture of expert language model (MoE-LM), which can include three main components: 1) a LM (a probabilistic encoder and a decoder) capable of learning diverse semantics for conversation histories, and as a result generating diverse utterances, which can be denoted as the primitive LM or $LM_0$, 2) a number of specialized LMs (or experts), $\{LM_i\}_{i=1}^m$, that each may be constructed using the latent space learned by $LM_0$, and may have been trained such that the expert is capable of generating utterances corresponding to a certain intent or personality, and 3) an RL-based dialogue manager (DM) that at each turn, given the latent state shared by the experts $\{LM_i\}_{i=0}^m$ and the utterance action(s) they suggest, may choose one among them for the agent to execute. The systems and methods can learn both the LMs (experts) and the DM. Additionally and/or alternatively, the DM in MoE-LM can be a policy conditioned on both the latent state and the actions suggested by the experts. The primitive LM ($LM_0$) can learn diverse semantics for conversation histories and allows the agent to generate a wide variety of utterances. The diversity can be shared with the specialized LMs (experts) and can give the models flexibility in generating the specialized utterances. The systems and methods can utilize modularity that facilitates adding and removing specialized LMs (experts). In some implementations, the hierarchical architecture can allow the system to solve an RL problem with much smaller state and action spaces. Since the candidate utterances are generated by experts with different intents, instead of combining all agent-user signals into a single RL reward, the DM agent can focus on optimizing the specific goal of the conversation task.

The systems and methods disclosed herein can include seq2seq LMs to generate the next utterances in a dialogue. The systems and methods can access to a dataset of the form $\mathcal{D}=\{(X^{(k)}, Y^{(k)})\}_{k=1}^{|\mathcal{D}|}$, where each $X=X^{(k)}$ is a L-turn conversation history $X=\{X_l\}_{l=0}^{L-1}$ and Y is its next utterance. An upper-bound on the length (number of tokens) of each utterance $X_l$ in X can be denoted as $N_X$. The role of a LM can be to predict the probability of the next utterance Y, including N tokens, conditioned on the conversation history X, i.e., $p(Y=\{y_n\}_{n=1}^N|X)$. In the transformer architecture, the LM may first encode the conversation history X using an encoder $\Phi$ to a ($L \times N_X$)-length sequence of embeddings $\{(z_{l,0}, \ldots, z_{l,N_X-1})\}_{l=0}^{L-1}$, where each $z_{l,n}$ is a vector in the latent space. For notational convenience, the systems and methods can concatenate these embeddings into a single embedding $z \in \mathcal{Z} \subseteq \mathbb{R}^d$ and may denote the overall dimension of the latent space as d. In the RNN architecture, the LM's encoder $\Phi$ may directly map the conversation history X to a latent state $z \in \mathcal{Z} \subseteq \mathbb{R}^d$. In one or both architectures, the next utterance $\hat{Y}=\{\hat{y}_n\}_{n=1}^N$ may be sampled token-by-token from the decoder $\Psi$ (i.e., $\hat{Y} \sim \Psi(\cdot|z) = \Pi_{n=1}^N \Psi(\hat{y}_n|\hat{y}_0, \ldots, \hat{y}_{n-1}; z)$), where $\hat{y}_0$ can be a fixed initial (start-of-sentence) token, and the latent state can be denoted as $z=\Phi(X)$.

Markov Decision Processes (MDPs) may have been used to model dialogue management problems in a variety of settings. The MDPs can be denoted by $\mathcal{M}=(\mathcal{S}, \mathcal{A}, P, r, s_0, \gamma)$. The state space $\mathcal{S}$ can represent the tokenized conversation history and the initial state $s_0 \in \mathcal{S}$ can be the initial user's query. The action space $\mathcal{A}$ can be the tokenized language space with each action $a \in \mathcal{A}$ being the agent's next utterance (which can be a fixed-length, $N_X$, sequence of tokens). The transition kernel P can model the user's response to the action taken by the agent (bot). Additionally and/or alternatively, the reward function r can measure the user's satisfaction. In these MDPs, we can think of the entire LM as a policy that maps conversation histories to next utterances, and may solve them by finding a policy $\pi^*$ with maximum expected discounted return (i.e., $\pi^* \in \mathrm{argmax}_\pi J_\pi := \mathbb{E}[\Sigma_{k=0}^\infty \gamma^t r_t | P, s_0, \pi]$). The size of the tokenized state and action spaces may grow exponentially with the size of the vocabulary. The growth can make the data intractable to solve the MDP even for a medium-size vocabulary.

The systems and methods may use open-domain dialogue as a running example to show how MoE-LM-based agents can improve user satisfaction measured by an improvement on a sentiment or engagement. A DM agent may possess different behaviors (e.g., inquisitive, explorative, relevant, soothing, empathetic, complimentary, provoking) and may swiftly decide which intent to use to pivot a conversation, build rapport, pique the user's interests, improve their mood, etc. To achieve the goal, the language model may utilize a language representation (primitive discovery) that captures different semantics, in order to encode different conversations and avoid generating dull and repetitive responses. A machinery (expert construction) may embed different intents into sub-models of this LM, such that they can behave accordingly when prompted, and respond efficiently. Additionally and/or alternatively, with various candidate utterances available, the DM module of the LM may understand the current level of user satisfaction and determine which response is the most appropriate. Motivated by these observations, the MoE-LM can be constructed in three steps as shown in FIG. 2.

The systems and methods can include primitive discovery. For example, the systems and methods can first employ a dataset $\mathcal{D}$, and learn a language model $LM_0=(\Phi, \mathcal{G}_0, \Psi)$ consisting of a stochastic encoder (i.e., an encoder $\Phi$ and a latent space distribution $\mathcal{G}_0$ that maps the encoded conversation into a latent distribution), and a decoder $\Psi$. The stochastic encoder $(\Phi, \mathcal{G}_0)$ can include an encoder $\Phi$ that maps tokenized conversation histories X to a latent space $\mathcal{Z} \subseteq \mathbb{R}^d$, i.e., $z=\Phi(X) \in \mathcal{Z}$, which can then be used to construct a parameterized d-dimensional Gaussian distribution $\mathcal{G}_0(z'|z)=\mathcal{N}(\mu_0(z), \sigma_0^2(z)\mathbf{I}_{d\times d})$ over $\mathbb{R}^d$. The decoder can predict the next utterance $\hat{Y}_0$ (token-by-token) conditioned on the point z' sampled from the latent distribution, i.e., $\Psi(\hat{Y}_0|z')$, $z' \sim \mathcal{G}_0(\cdot|z)$. In practice, the systems and methods can use both latent states as the input to the decoder model $LM_0(Y|X):=\mathbb{E}_{z' \sim \mathcal{G}_0(\cdot|z), z=\Phi(X)}[\Psi(Y|z')]$ can denote the primitive and can learn the primitive using a loss function that in addition to predicting the next utterance accurately, can encourage diversity and generalization in the learned latent space $\mathcal{Z}$ (e.g., Eq. 1). The loss function can include an unsupervised learning method for discovering primitive skills in trajectories that are used by one or more downstream RL tasks.

Expert Construction can include learning one or more latent distributions. For example, given the latent space $\mathcal{Z}$, encoder $(\Phi, \mathcal{G}_0)$, and decoder $\Psi$ learned in primitive discovery, the systems and methods can learn m latent distributions $\{\mathcal{G}_i\}_{i=1}^m$, each defined as $\mathcal{G}_i(z'|z)=\mathcal{N}(\mu_i(z), \sigma_i^2(z)\mathbf{I}_{d\times d})$. Each $\mathcal{G}_i$ corresponds to an attribute (e.g., an intent or a personality (in case of a chatbot)) and can generate samples in specific parts of the latent space $\mathcal{Z}$. The configuration can result in having m LMs, $\{LM_i\}_{i=1}^m$, $LM_i=(\Phi, \mathcal{G}_i, \Psi)$, each of them corresponding to a specialized version of the original LM, $LM_0$, and can serve as an expert in our MoE-LM. Upon receiving a conversation history X, each expert $LM_i$ can generate a candidate (or more) for the next utterance $\hat{Y}_i$ in certain parts of the language space that are compatible with its attribute (personality). Each $\mathcal{G}_i$ can be learned using a loss function that encourages a corresponding LM, $LM_i$, to generate utterances consistent with its attribute (e.g., Eq. 2).

Additionally and/or alternatively, the systems and methods can include a dialogue manager (DM). The dialogue manager, denoted by $\mu$, can take as input the encoded conversation history $z=\Phi(X)$ and the candidate action utterances generated by the experts $\{\hat{Y}_i\}_{i=0}^m$, and can select one of them as the action for the bot to execute (i.e., $\hat{Y} \sim \mu(\cdot|z, \{\hat{Y}_i\}_{i=0}^m))$.

In some implementations, the systems and methods can learn the primitive LM, $LM_0$, in the MoE-LM by solving the following KL-constrained optimization problem that aims at capturing diverse semantics:

$$\min_{(\Phi, \mathcal{G}_0, \Psi), \rho} \hat{\mathbb{E}}_{z' \sim \rho(\cdot|z,Y), z=\Phi(X)}[-\log \Psi(Y|z')], \quad (1)$$

$$\text{s.t. } \hat{\mathbb{E}}_{z=\Phi(X)}[KL(\rho(z'|z, Y) \| \mathcal{G}_0(z'|z))] \leq \varepsilon_{KL},$$

where $\hat{\mathbb{E}}$ is the empirical expectation over (X, Y) in the dataset $\mathcal{D}$, $\rho$ is a distribution over the latent space conditioned on the encoded conversation history z and the target utterance Y, and $\varepsilon_{KL}$ is a positive real-valued threshold. Using (1), the systems and methods can learn $LM_0=(\Phi, \mathcal{G}_0, \Psi)$ by maximizing the log-likelihood, while enforcing consistency between the latent variable z' predicted by $\mathcal{G}_0(\cdot|z)$ and $\rho(\cdot|z, Y)$ via the KL constraint. The distribution $\rho(\cdot|z, Y)$ can be a Gaussian $\mathcal{N}(\mu_\rho(z, \Phi_\rho(Y)), \sigma_\rho^2(z, \Phi_\rho(Y))\mathbf{I}_{d\times d})$ in which $\Phi_\rho$ is a pre-trained encoder for the target utterance Y, and mean $\mu_\rho(\cdot,\cdot)$ and variance $\sigma_\rho^2(\cdot,\cdot)$ are trainable models. One reason for using a separate encoder $\Phi_\rho$ for the target utterance Y may be to avoid overfitting $\Phi$ (i.e., to avoid having back-propagation gradient of $\Phi$ with Y as input).

The systems and methods can include a KL constraint in (1) as a penalty weighted by an appropriately chosen coefficient. Primitive discovery can include learning an encoder-decoder $\Phi, \Psi$ which can be modulated by the choice of z (i.e., changing z' while fixing X may lead to different distributions over generated utterances). The objective in (1) can encourage the diversity by conditioning the latent variable z' on both the target utterance Y and $z=\Phi(X)$, i.e., $z' \sim \rho(\cdot|z, Y)$. Additionally and/or alternatively, the KL constraint can be used to ensure that the stochastic encoder $\mathcal{G}_0(\cdot|z)$ of the primitive LM is not too varied for different Y, and thus has a limiting effect on diversity. For example, in the extreme when $\varepsilon_{KL}=0$ (or, $\beta \to \infty$ when used as a regularizer) there may be no specialization of the latent space for different Y. Although $\beta \to \infty$ may be an extreme case, degenerate behavior can occur when $\beta=1$. If the data can be modeled by a single LM then a VAE-optimal decoder $\Psi$ can simply ignore $\mathcal{G}_0$, leading to a degenerated latent space. In some implementations, the systems and methods can weaken the KL constraint ($\varepsilon_{KL} \gg 0$ or, equivalently, $\beta \ll 1$). The weakening can enable the approach to more reliably guarantee that a unique z' represents each distinct conversation pair (X, Y), which can capture diverse semantic modalities and enable easier downstream specialization.

The log-likelihood objective in (1) can lead to a learned $\Phi, \Psi$ that can recover any arbitrary desired LM by specializing the latent space $\mathcal{G}$. The coverage of an arbitrary LM on the conditional conversation data distribution $P_{\mathcal{D}}(Y|X)$ can be characterized based on one or more definitions.

Definition 1 can include $LM_{\mathcal{D},\xi}$ which can be a $\xi$-common LM of data $\mathcal{D}$ if $\mathbb{E}_{\mathcal{D}}[TV(LM_{\mathcal{D},\xi}(Y|X) \| P_{\mathcal{D}}(Y|X)))] \leq \xi$. The theoretical result can characterize the representational power of our primitive encoder-decoder pair $(\Phi, \Psi)$ on data $\mathcal{D}$.

Definition 2 can let $(\Phi, \rho, \Psi)$ be the solution to (1) with $\hat{\mathbb{E}}_{z' \sim \rho(\cdot|z,Y), z=\Phi(X)}[-\log \Psi(Y|z')]=\varepsilon$. Then $LM:=(\Phi, \mathcal{G}, \Psi)$ can be configured such that $$\mathbb{E}_{\mathcal{D}}[TV(LM_{\mathcal{D},\xi}(Y|X) \| LM(Y|X))] \leq \xi + \sqrt{\frac{1}{2}(\varepsilon + \mathcal{H})},$$

where $\mathcal{G}(z'|z)=\mathbb{E}_{Y \sim \mathcal{D}}[\rho(z'|z, Y)]$, and $\mathcal{H}=\mathbb{E}_{\mathcal{D}}[\log P_{\mathcal{D}}(Y|X)]$ can be a constant depending on $\mathcal{D}$. As long as $LM_{\mathcal{D},\xi}$ is $\xi$-common in $\mathcal{D}$, then there can exist a specialization of the latent space $\mathcal{G}$ that, when paired with $\Phi, \Psi$, can approximately recover $LM_{\mathcal{D},\xi}$. The quality of the approximation can be a function of $\varepsilon$ (e.g., how well the objective in (1) was optimized) and $\xi$. To construct the primitive by replacing $\mathcal{G}$ with $\mathcal{G}_0$ (i.e., $LM_0=(\Phi, \mathcal{G}_0, \Psi)$)

because $\mathcal{G}_0(z'|z)$ can be viewed as a distillation of $\rho(z'|z, Y)$. The systems and methods can use the trained encoder-decoder pair $\Phi, \Psi$ to learn a spectrum of different specialized experts parameterized by different latent distributions $\mathcal{G}_i$.

In some implementations, the MoE framework can include a gamut of different experts $LM_i, \forall i \in \{1, \ldots, m\}$, with each generating candidate utterances of different intents. By viewing each expert as a distribution of particular behaviors in conversation data $\mathcal{D}$, the systems and methods can adopt a universal encoder-decoder $(\Phi, \Psi)$ among all the experts. Therefore, each expert i may be parameterized by an arbitrary d-dimensional latent distribution (e.g., Gaussian), and the systems and methods can sample certain regions of the latent space $\mathcal{Z}$. The experts may all be categorized as plug-and-play language models (PPLMs). Creating new experts can include learning new latent distributions, while switching between experts amounts to sampling a different distribution.

Denoted by $\ell_i(X, Y) \in \mathbb{R}$, a real-valued label can characterize the intent of expert $i \in \{1, \ldots, m\}$ (e.g., determined by an off-the-shelf sentiment classifier). The systems and methods can train the latent distribution $\mathcal{G}_i(z)$ of expert i by solving the optimization problem $$\min_{\mathcal{G}_i} \hat{\mathbb{E}}_{z' \sim \mathcal{G}_i(\cdot|z), z=\Phi(X), Y \sim \Psi(\cdot|z')}[-\ell_i(X, Y)]. \quad (2)$$

Unlike the weighted maximum likelihood approach, which assigns weight $\ell_i$ to training samples that correspond to expert i, the systems and methods may learn each expert via reward-maximization and treat $\ell_i$ as a reward signal with respect to expert i to be maximized. The approach may be linked to reinforcement learning (RL), in which both the "state" and "action" spaces are the latent space $\mathcal{Z}$, and the "policy" can be the latent distribution $\mathcal{G}_i$. The systems and methods may not need to rely on the target utterance Y from data $\mathcal{D}$ and can thus be less vulnerable to data-imbalance issues in $\mathcal{D}$ on certain intents. For example, in some implementations, the reward-maximization problem can be myopic (i.e., the above RL problem has a discounting factor of 0). Unlike dialogue management that can be a sequential decision-making problem, the systems and methods can be configured such that each expert possesses particular behaviors, and the configuration can readily be done via greedy maximization. Long-term dialogue optimization may be handled by the dialogue manager rather than these experts.

For example in the case of a Gaussian $\mathcal{G}_i$, the systems and methods can utilize a standard reinforcement algorithm to learn the model parameters $(\mu_i, \sigma_i^2)$ of $\mathcal{G}_i$ according to $$\{\mu_i, \sigma_i\} \leftarrow \{\mu_i, \sigma_i\} + \alpha \cdot \mathbb{E}_{z' \sim \mathcal{G}_i(\cdot|z), Y \sim \Psi(\cdot|z')}[\ell_i(X,Y) \cdot$$
$$\nabla_{\{\mu_i, \sigma_i\}} \log \mathbb{P}_{\mathcal{G}_i}(z'|z)], i \in \{1, \ldots, m\},$$

where $\alpha > 0$ is the learning rate. To reduce the variance of these estimates, the systems and methods may adopt a baseline reduction technique in policy gradient. The adoption can be performed by replacing $\ell_i(X, Y)$ with $\bar{\ell}_i(x, Y) := \ell_i(X, Y) - \mathbb{E}_{Y \sim \Psi(\cdot|\Phi(X))}[\ell_i(X, Y)]$. To quantify the performance of expert $LM_i$, the sub-optimality result can be generated.

The i-th reward-maximizing objective can be denoted as $\mathcal{L}_i(LM) := \hat{\mathbb{E}}_{Y \sim LM(\cdot|X)}[\ell_i(X, Y)]$. An optimal LM for the objective $LM_{i,\xi} \in \operatorname{argmax}_{LM} \mathcal{L}_i(LM)$ may be $\xi$-common in $\mathcal{D}$. Additionally and/or alternatively, $\mathcal{G}_i^*$ may be in the argmin of (2). Then with expert $LM_i = (\Phi, \mathcal{G}_i^*, \Psi)$ and $(\varepsilon, \mathcal{H})$, the systems and methods can include $$|\mathcal{L}_i(LM_i) - \mathcal{L}_i(LM_{i,\xi})| \leq 2\|\ell_i\|_\infty \cdot \left(\xi + \sqrt{\frac{1}{2}(\varepsilon + \mathcal{H})}\right).$$

The systems and methods may optimize $\mathcal{G}_i$ with respect to (2), which encourages expert $LM_i$ to capture the behaviors encouraged by $\ell_i$. The corollary may provide two additional implications: (i) Since the sub-optimality of $LM_i$ compared to the oracle $LM_{i,\xi}$ is bounded by the quantity $\varepsilon$, it justifies using the primitive $(\Psi, \Phi)$, which optimizes $\varepsilon$, for expert construction; (ii) Sub-optimality further depends on $\xi$, quantifying how well $LM_{i,\xi}$ is represented in the original dataset $\mathcal{D}$.

The systems and methods disclosed herein can utilize one or more dialogue managers (e.g., one or more dialogue managers (DM) for the MoE-LM) and may utilize one or more RL techniques to train the respective dialogue manager(s). The DM can include a policy $\mu$ that processes the encoded conversation history $z = \Phi(X)$ and the m+1 candidate action utterances generated by the experts $\{\hat{Y}_i\}_{i=0}^m$, and may stochastically select one of them to execute (i.e., $\hat{Y} \sim \mu(\cdot|z, \{\hat{Y}_i\}_{i=0}^m)$). Each expert $i \in \{0, \ldots, m\}$ may be a LM, $LM_i$, that acts as a policy $\pi_i(\cdot|X)$ and may map each conversation history X to an utterance $\hat{Y}_i$. The architecture can be utilized to address the large size of state and action spaces in the original MDP that grows exponentially with the size of the vocabulary. The state and action spaces of the original MDP can be the tokenized conversation history and the tokenized language space, respectively, while the DM may choose among m+1 actions given the latent space $\mathcal{Z}$ of encoded conversations. The MoE-LM may be different than other hierarchical architectures in which the decision at the high-level is to select a low-level controller only based on the current state of the system. In some MoE-LMs, the DM may observe both the current state and the actions suggested by the experts and may then select one among them.

The systems and methods can learn the DM policy $\mu$ by solving an MDP, which may be referred to as MoE-MDP, and may denote the MoE-MDP by $\bar{\mathcal{M}} = (\bar{\mathcal{S}}, \bar{\mathcal{A}}, \bar{P}, \bar{R}, \bar{s}_0, \gamma)$. The state space of MoE-MDP can be the product of the learned latent space $\mathcal{Z}$ and the joint action space of the m+1 experts (i.e., $\bar{\mathcal{S}} = \mathcal{Z} \times \mathcal{A}^{m+1}$). The respective action space can include the m+1 experts, i.e., $\bar{\mathcal{A}} = \{0, \ldots, m\}$. The initial state can be the encoding of the initial user's query and the utterances suggested by the experts in response to this query. The transition can continue to model user's responses but may now be over the joint space of the latent states and experts' actions. The reward function can be the same as in the original MDP (i.e., $\bar{r}(\bar{s}, \bar{a}) = r(X, a_{\bar{a}})$), where $\bar{s} = (z, \{a_i\}_{i=0}^m)$ with $a_i \sim \pi_i(\cdot|X)$ and $z = \Phi(X)$, and $\bar{a} \in \{0, \ldots, m\}$ is the expert selected by the DM. Since MoE-MDP may have a finite number of actions, learning DM can be equivalent to solving a finite-action MDP and finding a policy $\mu$ in the m-dimensional simplex with maximum expected cumulative discounted reward.

The systems and methods may use two RL techniques to solve the MoE-MDP and learn the DM policy $\mu$. The first technique may include conservative Q-learning (CQL) (Kumar et al., "Conservative q-learning for offline reinforcement learning," ADVANCES IN NEURAL INFORMATION PROCESSING SYSTEMS, 1179-1191 (December 2020).). The technique can be suitable for the setting in which the policy may be learned from the collected conversations $\mathcal{D}$ with no further (online) interaction with the real system. CQL can be a regularization scheme that learns a conservative Q-function that lower-bounds the true one. Given the offline conversation data $\mathcal{D}$, the systems and methods can parameterize the Q-function by parameter $\theta$ and learn $\theta$ by minimizing the Bellman error with behavior regularization: $\min_\theta \Sigma_{(\bar{s},\bar{a},\bar{r},\bar{s}_+)\in\mathcal{D}} \alpha(\mathbb{E}_{\bar{a}\sim\mu}[Q_\theta(\bar{s},\bar{a})]-Q_\theta(\bar{s},a_0))+(\bar{r}+\gamma Q_{\theta^{target}}(\bar{s}_+, \mathrm{argmax}^{\chi}{}_{\bar{a}_+\in\mathcal{A}} Q_\theta(\bar{s}_+, \bar{a}_+))-Q_\theta(\bar{s}, \bar{a}))^2$, where $a_0$ is action suggested by the primitive LM (which can approximate the behavior policy of $\mathcal{D}$) $a_0\sim\pi_0$, $\alpha>0$ is a regularization parameter, and $\theta^{target}$ is the target Q-function parameter. CQL regularization can minimize the differences in Q-values of our DM and the primitive. According to the CQL technique, the systems and methods can set the DM as $\mu(\bar{a}|\bar{s})\propto\exp(Q_\theta(\bar{s},\bar{a}))$, which may correspond to the optimal policy of the entropy-regularized Q-learning (Schulman et al., "Equivalence Between Policy Gradients and Soft Q-Learning," ARXIV (Oct. 14, 2018), https://arxiv.org/pdf/1704.06440.pdf.).

The second RL technique may include model-based RL (MBRL) (Shah et al., "Bootstrapping a neural conversational agent with dialogue self-play, crowdsourcing and on-line reinforcement learning," IN PROCEEDINGS OF THE 2018 CONFERENCE OF THE NORTH AMERICAN CHAPTER OF THE ASSOCIATION FOR COMPUTATIONAL LINGUISTICS: HUMAN LANGUAGE TECHNOLOGIES, Volume 3 (Industry Papers), pages 41-51, 2018.). The systems and methods may learn a user utterance model $P_{user}(X_+|X, a) := \mathbb{E}_{z=\Phi_{user}([X,a])}[\Psi_{user}(X_+|z)]$ via maximum likelihood, then generate data $\mathcal{D}_{MB}$, whose next-state $\bar{s}_+$ encodes the next conversation generated from roll-outs and the corresponding candidate actions, and may solve the Bellman error minimization in MoE-MDP: $\min \Sigma_{(\bar{s},\bar{a},\bar{r},\bar{s}_+)\in\mathcal{D}_{MB}}(\bar{r}+\gamma Q_{\theta^{target}}(\bar{s}_+, \mathrm{argmax}^{\chi}{}_{\bar{a}_+\in\mathcal{A}} Q_\theta(\bar{s}_+, \bar{a}_+))-Q_\theta(\bar{s}, \bar{a}))^2$. The benefit of MBRL over CQL can be two-fold. First, the system can easily obtain a high-fidelity user utterance model by simply fine-tuning a large LM. Second, with sufficient dialogue roll-outs that captures many different scenarios, MBRL may not rely on behavior regularization and can be less conservative.

One implementation of the MoE-approach for dialogue management is evaluated on two benchmark open-domain tasks below. The first benchmark is Cornell (Danescu-Niculescu-Mizil et al., "Chameleons in imagined conversations: A new approach to understanding coordination of linguistic style in dialogs," ARXIV (Jun. 15, 2011) https://arxiv.org/pdf/1106.3077.pdf.), which include conversations between speakers in different movie lines and has a median conversation length of 3 utterances. The second benchmark is the Reddit (Ghandeharioun et al., "Approximating interactive human evaluation with self-play for open-domain dialog systems," ADVANCES IN NEURAL INFORMATION PROCESSING SYSTEMS, 32, 2019.), which is a casual conversation corpus on various topics between users of at least 3 turns with the median conversation containing 7 utterances.

The evaluation includes conducting several experiments to test the efficacy of different parts in the MoE-LM, namely (i) the predictive power and diversity of the primitive, (ii) the quality of experts, and (iii) the overall DM performance. For each metric, the mean±standard deviation over an evaluation set of 100 conversations is reported. An ablation study on 4 transformer-based MoE-LMs, namely MoE-1, MoE-2, MoE-3-MoE-4, were performed to understand how performance is affected by different model architectures, language encoders, and latent generators. MoE-1 and MoE-2 may use a simpler architecture, while MoE-3 and MoE-4 may use the same encoder architecture as BERT. MoE-1 may use much smaller latent distribution models $\{\mathcal{G}_i\}$ than MoE-2; MoE-3 may use the pre-trained BERT encoder, while MoE-4 may train that from scratch.

The first experiment can include comparing primitive models.

The experiment can compare the quality of latent representations learned by 4 implementations of MoE-LMs and 2 baselines (e.g., standard Transformer (Wolf et al., "Huggingface's transformers: State-of-the-art natural language processing," ARXIV (Jul. 14, 2020) https://arxiv.org/pdf/1910.03771.pdf.) and VHRED (Serban et al., "A hierarchical latent variable encoder-decoder model for generating dialogues," IN PROCEEDINGS OF THE AAAI CONFERENCE ON ARTIFICIAL INTELLIGENCE, volume 31, 2017b.)). To assess their quality, for each test conversation, the experiment may generate 25 utterances and may report 3 metrics: (i) Diversity: The 1—Sparsity of the singular values of the embedded utterances (i.e., Diversity($\{\hat{Y}_i\}$):=$1-\sqrt{d}-\|SVD\|_1/\|SVD\|_2/\sqrt{d-1}\in[0,1]$, where $SVD:=SVD(\{\Phi_{SE}(\hat{Y}_i)\}_{i=1}^{25})$, and $\Phi_{SE}$ is a pre-trained sentence encoder); (ii) Dist-$\{1,2,3\}$: Ratio of unique $\{1,2,3\}$-gram in the generated utterances; (iii) Perplexity. The metrics may measure both accuracy and semantic diversity.

The results of the above experiments are reported in Table 1. In comparisons with the baselines (Transformer and VHRED), generally (i) transformer-based LMs may outperform VHRED due to their attention mechanism that explicitly encodes sequential semantic information, and (ii) the MoE-LMs may achieve better diversity without sacrificing much on accuracy (i.e., the perplexity scores are still quite low). Qualitatively, the sample utterances generated by the Transformer may be closer to the targets than that by MoE-2 and MoE-4, which may be because Transformer tends to memorize the corpus. The MoE-LMs may generate utterances that have similar contexts with targets with paraphrased or similar structures but different contexts, demonstrating their generalizability.

Among different MoE-LMs, MoE-2 and MoE-4 may have the best performances, particularly MoE-4 may have better diversity while MoE-2 has lower perplexity. The results can corroborate with the hypotheses that (i) jointly training the encoder and decoder with Eq. 1 may be utilized to encourage semantic diversity (as opposed to using a pre-trained BERT encoder, which maximizes likelihood), (ii) sufficient representation power may be utilized for $\mathcal{G}_0$ to match the posterior distribution $\rho$ in order to capture different semantics in $\mathcal{D}$. The latent space of 200 conversation data may be sampled for both Transformer and MoE-4. The latent states of MoE-4 may be more dispersed across the embedding space, implying that most conversations get encoded uniquely. In contrast, the latent space of Transformer may have many clusters, suggesting the latent space is more prone to generating similar utterances even with different input conversation and may thus be less generalizable.

| Method | Diversity | Dist-1 | Dist-2 | Dist-3 | Perplexity |
| --- | --- | --- | --- | --- | --- |
| MOE-1 | 0.078 ± 0.04 | 0.29 | 0.68 | 0.79 | 28.68 ± 41.32 |
| MOE-2 | 0.15 ± 0.02 | 0.33 | 0.81 | 0.92 | 42.14 ± 35.24 |
| MOE-3 | 0.093 ± 0.02 | 0.31 | 0.77 | 0.90 | 44.27 ± 57.73 |
| MOE-4 | 0.17 ± 0.01 | 0.41 | 0.89 | 0.94 | 52.12 ± 18.20 |

-continued

| Method | Diversity | Dist-1 | Dist-2 | Dist-3 | Perplexity |
|---|---|---|---|---|---|
| Trans. | 0.091 ± 0.02 | 0.28 | 0.71 | 0.83 | 20.77 ± 10.22 |
| VHRED | 0.11 ± 0.02 | 0.37 | 0.68 | 0.80 | 88.61 ± 23.55 |

Table 1 can be descriptive of an accuracy (perplexity) and diversity of language primitive experts trained with Reddit.

| Method | User Tot. Sent. | User Sent. Trans. | GPT-Perplexity |
|---|---|---|---|
| MoE-4 Primitive | −0.05 ± 0.07 | 0.05 ± 0.09 | 81.17 ± 43.41 |
| MOE-4 DQN | 0.04 ± 0.10 | 0.02 ± 0.16 | 79.43 ± 45.70 |
| MOE-4 CQL | 0.09 ± 0.16 | 0.08 ± 0.17 | 75.48 ± 47.13 |
| MOE-4 MBRL | 0.12 ± 0.15 | 0.10 ± 0.13 | 82.75 ± 42.72 |
| Trans. RL | −0.26 ± 0.12 | −0.11 ± 0.14 | 168.80 ± 75.35 |
| Trans. KLC | 0.03 ± 0.09 | −0.03 ± 0.05 | 108.73 ± 68.21 |
| Trans. VHRL | 0.05 ± 0.11 | 0.01 ± 0.11 | 135.47 ± 55.78 |

Table 2 can be descriptive of a performance (with respect to average user satisfaction in conversation) of RL-based DM trained with Reddit.

Experiment 2 can evaluate a quality of experts.

The experiment can compare the performance of experts learned by the 4 MoE-LMs (where experts are separately trained by optimizing Eq. 2) and 2 baselines (WD (Holtzman et al., "Learning to write with cooperative discriminators," ARXIV (May 16, 2018), https://arxiv.org/pdf/1805.06087.pdf.) and PPLM (Dathathri et al., "Plug and play language models: A simple approach to controlled text generation," ARXIV (Mar. 3, 2020), https://arxiv.org/pdf/1912.02164.pdf.)). To study the sub-optimality gap, the evaluation can include the performance of Transformer-based expert end-to-end LMs that are individually optimized with REINFORCE (Li et al., "Deep reinforcement learning for dialogue generation," ARXIV (Sep. 29, 2016), https://arxiv.org/pdf/1606.01541.pdf.), using the expert labels $\{\ell_i\}$ as rewards. The systems and methods may use the following label functions to define the intents of experts: (i) $\ell_{pos-sent}(Y)$, $\ell_{neg-sent}(Y)$, $\ell_{joy}(Y)$, $\ell_{optimism}(Y)$, $\ell_{anger}(Y)$, $\ell_{sadness}(Y)$ quantify 6 different sentiment tones and may be constructed by a RoBERTa-based sentiment detector (Liao et al., "An improved aspect-category sentiment analysis model for text sentiment analysis based on roberta," APPLIED INTELLIGENCE, 51(6): 3522-3533, 2021.) that predicts whether an utterance is of positive or negative sentiment, and whether it falls into any of the 4 more-refined emotions: {joy, optimism, sadness, anger}; (ii) $\ell_{sent-coh}(X, Y)$ measures empathy, i.e., bot's sentiment coherence with user's; (iii) $\ell_{question}(Y)$ outputs 1 when a bot question is detected and 0 otherwise; (iv) $\ell_{exp}(X, Y)$ quantifies exploration (i.e., the tendency to avoid repetitive contexts).

The results of the above experiments can be reported in Table 3. Compared with the baseline LMs, generally the experts created under the MoE-LM framework, especially under MoE-2 and MoE-4, may better capture all different language intents (where WD and PPL appear to capture negative sentiments and emotions much more effectively than behaviors), demonstrating the efficacy of some implementations of the approach which constructed specialized experts on a diverse language space via reward maximization (instead of weighted MLE).

Similar to the ablation study in experiment 1, all the experts associated with MoE-2 and MoE-4 may be among the best performing in capturing language intents. With the Reddit data the experts in MoE-4 may perform the best, while with much less data (Cornell) the best experts may be built upon the simpler MoE-2 architecture. The difference may be due to over-fitting issues faced by the larger LMs (MoE-4) when there is insufficient data for expert fine-tuning.

Sentiment experts' latent distributions may be clearly separated (because positive and negative sentiments have opposite behaviors), while the emotion expert's latent distribution may have more gradual separations and even some overlaps (because e.g., joy versus optimism are quite similar, while joy versus anger are quite different). The distribution can validate that the MoE-LM represents different behaviors in separate regions of the latent space and may justify the structural prior of modeling each expert as a specialized version of the primitive LM, whose latent distribution focuses on particular regions.

| Method | Question | Exploration | Positive Sent. | Negative Sent. | Sent. Coherence | Joy | Optimism | Anger | Sadness |
|---|---|---|---|---|---|---|---|---|---|
| MoE-1 | 0.75 ± 0.14 | 0.49 ± 0.12 | 1.02 ± 0.35 | 0.4 ± 0.33 | 0.51 ± 0.48 | 1.12 ± 0.32 | −0.19 ± 0.55 | 0.47 ± 0.56 | 1.01 ± 0.67 |
| MoE-2 | 0.96 ± 0.18 | 0.58 ± 0.2 | 3.41 ± 0.56 | 2.08 ± 0.71 | 0.55 ± 0.44 | 2.02 ± 0.65 | 1.27 ± 0.41 | 1.32 ± 0.69 | 2.09 ± 0.99 |
| MoE-3 | 0.43 ± 0.27 | 0.5 ± 0.33 | 1.03 ± 0.32 | 1.05 ± 0.29 | 0.62 ± 0.41 | 1.17 ± 0.42 | 0.42 ± 0.51 | 0.28 ± 0.32 | 1.15 ± 0.27 |
| MoE-4 | 0.91 ± 0.25 | 0.53 ± 0.4 | 3.34 ± 0.77 | 2.12 ± 0.64 | 0.5 ± 0.36 | 2.28 ± 1.59 | 1.59 ± 0.99 | 2.01 ± 1.32 | 2.27 ± 0.45 |
| WD | 0 ± 0 | 0.16 ± 0.29 | −0.96 ± 1.86 | 1.36 ± 2.02 | 0.69 ± 0.23 | −0.84 ± 0.4 | −1.77 ± 1.36 | 0.92 ± 0.35 | 1.99 ± 1.5 |
| PPLM | 0.21 ± 0.34 | 0.56 ± 0.32 | 0.46 ± 0.21 | 0.55 ± 0.09 | 0.64 ± 0.27 | 0.39 ± 0.15 | 0.41 ± 0.48 | 0.69 ± 0.22 | 1 ± 0.21 |
| Trans. RL* | 0.99 ± 0.23 | 0.54 ± 0.18 | 3.53 ± 1.64 | 1.89 ± 1.2 | 0.72 ± 0.3 | 2.88 ± 2.36 | 1.8 ± 2.39 | 1.62 ± 2.39 | 2.35 ± 1.47 |

Table 3 can be descriptive of a quality of each expert PPLM trained on Reddit dataset with respect to the trained labels.

Experiment 3 can evaluate the MoE-RL against DialoGPT Simulated Users.

The experiment can compare the dialogue management performance of MoE-LM, for which their DMs μ are trained with different methods (BC, DQN, CQL, MBRL), with 3 baselines (REINFORCE, KL-control (Jaques et al., "Way off-policy batch deep reinforcement learning of implicit human preferences in dialog," ARXIV (Jul. 8, 2019), https://arxiv.org/pdf/1907.00456.pdf.), and VHRL (Saleh et al., "Hierarchical reinforcement learning for open-domain dialog," IN PROCEEDINGS OF THE AAAI CONFERENCE ON ARTIFICIAL INTELLIGENCE, volume 34, pages 8741-8748, 2020.)). According to the results on expert quality in experiment 2, the MoE-2 and MoE-4 frameworks were selected for evaluation for the Cornell and Reddit tasks respectively. For systematic evaluation, the evaluation includes performing the experiment by having these RL agents interact with a DialoGPT (Zhang et al., "Dialogpt: Large-scale generative pre-training for conversational response generation," ARXIV (May 2, 2020), https://arxiv.org/pdf/1911.00536.pdf.) simulated user environment (a large LM capable of conducting natural open-domain conversations), for a maximum of 5 turns. The DM task can be to maximize total user satisfaction in the conversation level, which can be measured by both (i) user's overall sentiment, and (ii) user's sentiment transition. To construct an immediate reward that serves as a surrogate for user satisfaction, the systems and methods may set $$r(X, a, X_+) = \lambda_1 \ell_{sent}(X_+) + \lambda_2 \left( \ell_{sent}(X_+) - \frac{1-\gamma}{1-\gamma^L} \sum_{l=0}^{L-1} \gamma^l \ell_{sent}(X_l) \right),$$

where the linear combination weights $(\lambda_1, \lambda_2)=(0.75, 0.25)$ correlate with (Ghandeharioun et al., "Approximating interactive human evaluation with self-play for open-domain dialog systems," ADVANCES IN NEURAL INFORMATION PROCESSING SYSTEMS, 32, 2019.), and $\ell_{sent}(X)$ may be the same RoBerTa-based sentiment labeler as in experiment 2, which assigns a score from $[-1,1]$ that can be proportional to the positive sentiment and inversely proportional to the negative sentiment prediction probabilities. To ensure the baseline RL DM methods can also possess certain bot-level features, e.g., question, positive sentiment, etc., besides the above RL reward for user satisfaction we also optimize a linear combination of bot-based rewards when training the baseline models. Since the DM problem may last at most 5 turns, the experiment use this as the effective horizon and set $\gamma=1-1/5=0.8$. To evaluate the fluency of the LMs, the experiment may report the GPT-perplexity, which can compute the perplexity score of the final utterance with respect to a DialoGPT LM.

The results of the above experiments are reported in Table 2. The experiments can show that MoE-LMs outperform most baseline methods on DM performance. The results may be descriptive of the impact of two factors: (i) MoE-MDP restricts the action space into a smaller set of candidate utterances generated by experts (whose qualities are validated in EXP2), the corresponding RL problem then becomes simpler and requires less data (especially in Cornell) to solve. (ii) Unlike the baseline RL methods, which need to optimize both bot-and-user signals, the MoE DM agents focus on optimizing the user satisfaction goal and are therefore more effective. The MoE-LMs may have lower (better) GPT-perplexity scores than other methods. The results may be based on the MoE-LM using pre-trained encoder and decoder from the primitive LM, which are optimized for generalization and accuracy, while other RL methods may distort their language representations to create utterances that maximize reward but become less natural. Among different MoE-RL strategies, MBRL, which first learns a user utterance model (the model uses the same encoder from the primitive LM and learns a separate decoder for user-utterance prediction) and does Q-learning, may perform the best of the tested model configurations. CQL may moderately improve upon the primitive LM (behavior policy), while DQN may appear to be less effective in solving the offline RL problem.

In some implementations, the systems and methods may utilize a KL-contrastive constraint. The KL-constraint may enforce consistency in the latent variables predicted by the semantic generator and the posterior. However, since both $\mathcal{G}_0(z'|z)$ and $\rho(z'|z, Y)$ are both models to be learned, if the data can be modeled with a single, stationary LM that does not depend on the latent space, one trivial degenerated solution (that satisfies the KL constraint) may be to have both of these models output very small values, which may impede the generalizability (and diversity) of the LM embedding, especially to unseen conversations. Utilizing analogous arguments that connects KL distribution matching and mutual information maximization in representation learning, the issue can be addressed by considering the KL-contrastive constraint, i.e., let $F(z, Y):=KL_{z'}(\rho(z'|z, Y) \| \mathcal{G}_0(z'|z))$, we replace the constraint in the optimization problem in (1) with $$\hat{\mathbb{E}}_{z=\Phi(X), Y\sim D}\left[F(z, Y) + \alpha \cdot \log \frac{\exp(-F(z, Y))}{\int_{Y'} \exp(-F(z, Y))}\right] \leq \varepsilon_{KL},$$

where $\alpha>0$ is a trade-off factor in the KL-contrastive constraint. While the first part of the constraint limits $F(z, Y)$, the second part may enforce $F(z, Y)$ to a much higher value in the positive samples (e.g., with respect to ground-truth next utterance) than in the negative samples (e.g., with respect to other next-utterance candidates). The constraint can prevent the aforementioned degeneration issue and inject flexibility to control the size of the latent representation space.

The systems and methods may utilize one or more bottlenecks. The systems and methods may employ discretization of $\Phi$ and $\mathcal{G}_0$ to encourage better generalization to out-of-distribution inputs. In some implementations, the systems and methods may parameterize $\Phi(X)=disc_{16}(\tilde{\Phi}(X))$, where the output of $\tilde{\Phi}$ is a continuous-valued vector in $\mathbb{R}^d$ and the discretization operator $disc_K$ may be configured as follows:

Given vector $v \in \mathbb{R}^d$, split $v$ into $v_1, \ldots, v_{d/K}$ vectors, each of size K.

For each $v_i$, sample a one-hot vector $v_i'$ of size K based on a softmax categorical distribution with logits given by $v_i$.

Concatenate the vectors $v_i'$ to yield a multi-hot vector $v'$ of size d.

When computing the backward pass on $v'$, use straight-through gradients; i.e., $$\frac{\partial v_i'}{\partial v_i} = \frac{\partial softmax(v_i)}{\partial v_i}.$$

The systems and methods may discretize $z'$, the output of $\mathcal{G}_0$. The systems and methods may first parameterize $\mathcal{G}_i$ as a Gaussian and may then discretize that to form a multinomial distribution that produces multi-hot (d/K-hot, K=16) vectors. In some implementations, the systems and methods may employ the same discretization for the experts $\mathcal{G}_i$ and the prior $\rho(z'|z, Y)$.

To avoid convergence to local minima for $\Phi$, the systems and methods may employ an entropy regularizer on the discrete distribution it is sampled from. The systems and methods may use an adaptive entropy regularizer with a fixed target entropy that is a hyper-parameter.

Example model parameters are described for some implementations of MoE-1, 2, 3 and 4 below. The models may represent Mixture of Experts and may include one or more transformers. The transformer can be an encoder-decoder based model that uses self-attention to capture relationships between the elements of the sequence. In some implementations, the systems and methods may utilize multi-head attention (e.g., an implementation similar to https://www.tensorflow.org/text/tutorials/transformer#point_wise_feed_forward_network).

MoE-1 and MoE-2 may use the simple transformer architecture, while MoE-3 and MoE-4 may use the same encoder architecture as BERT. MoE-1 may use much smaller latent distribution models $\{\mathcal{G}_i\}$ than MoE-2; MoE-3 may use a pre-trained BERT encoder (https://tfhub.dev/tensorflow/bert_en_uncased_L-12_H-768_A-12/4), while MoE-4 may train the model from scratch.

The transformer model parameters for the simple transformer architecture may be summarized in Table 4:

| Parameter | Value |
| --- | --- |
| Number of layers | 2 |
| Embedding hidden size | 256 |
| FFN inner hidden size | 512 |
| Attention heads | 8 |
| Key size | 256 |
| Value size | 256 |
| Dropout | 0.1 |

Table 4 can be descriptive of a simple transformer architecture.

The BERT based transformer model may be similar to the architecture from Table 4. The differences for a pre-trained BERT model may be captured in Table 5.

| Parameter | Value |
| --- | --- |
| Embedding hidden size | 768 |
| Number of layers | 12 |
| Attention heads | 12 |

Table 5 can be descriptive of a BERT-based transformer architecture.

The differences for a BERT model trained from scratch may be captured in Table 6.

| Parameter | Value |
| --- | --- |
| Embedding hidden size | 768 |
| Number of layers | 2 |
| Attention heads | 8 |

Table 6 can be descriptive of trainable, smaller "BERT"-based transformer architecture.

Latent distributions $\{\mathcal{G}_i\}$ may be implemented as FFN that model mean and variance of the normal distribution. The MoE-1, 2, 3, 4 may use different values for the hidden size of the neural network. Additionally and/or alternatively, MoE-1 and 3 may use target entropy of 0.1, MoE-2 and 4 may use target entropy of 1.0. The common parameters for FFN may be captured in Table 7 (e.g., FFN may have a final layer without an activation).

| $\{\mathcal{G}_i\}$ FFN parameter | Value |
| --- | --- |
| Number of layers | 1 |
| Activation | tanh |

Table 7 Table 7 can be descriptive of a $\{\mathcal{G}_i\}$ FFN architecture.

Table 8 may show individual parameters distinct for each of MoE models.

| MOE model parameter | $\{\mathcal{G}_i\}$ FFN hidden size | Embedding hidden size | Uses BERT encoder | Pre-trained BERT |
| --- | --- | --- | --- | --- |
| MOE-1 | 128 | 128 | No | N/A |
| MOE-2 | 32 | 128 | No | N/A |
| MOE-3 | 256 | 768 | Yes | Yes |
| MOE-4 | 256 | 768 | Yes | No |

Table 8 can be descriptive of MoE parameters.

Training and evaluation may be performed on 8 GPU instances with 20 GB of RAM and a NVIDIA Tesla P100 graphics card.

Each batch of training data contains a subset of such conversations.

During experiment 2 above, several types of language experts were defined whose utterance outputs can be utilized to smooth bot responses when used in dialogue interactions with users.

The first type of experts generated can be sentiment-based, which can provide a fluent expression of emotions for generating a sense of understanding in human conversations. To quantify the emotional tone of a bot utterance, the systems and methods may utilize one or more sentiment detectors, which may output 2 sets of prediction probabilities—(i) whether a bot utterance is of positive, neutral, or negative sentiment; (ii) whether the bot utterance falls into any of the 4 more-refined emotions: {joy, optimism, sadness, anger}.

Neglecting the neutral sentiment output, the systems and methods may define 6 sentiment labeling functions: $\ell_{pos-sent}(Y)$, $\ell_{neg-sent}(Y)$, $\ell_{joy}(Y)$, $\ell_{optimism}(Y)$, $\ell_{anger}(Y)$, $\ell_{sadness}(Y)$, which may output a score that depends on sentiment prediction probability of any candidate bot utterance. The system may generate a sentiment-empathetic expert whose utterances will be coherent with the user's sentiment.

In some implementations, RoBERTa may give scores for each of the 6 categories listed above, which then are summed weighted by the coefficients in Table 9 to produce the sentiment-based score:

| Sentiment | Coefficient |
| --- | --- |
| pos-sent | 0.5 |
| neg-sent | −0.5 |
| joy | 0.5 |
| optimism | 1 |
| sadness | −1 |
| anger | −0.5 |

Table 9 can be descriptive of sentiment based label coefficients.

To quantify sentiment coherence between the user and bot, the labeling function $\ell_{sent-coh}(X, Y)$ may calculate the cosine similarity of user-bot sentiment embeddings (which corresponds to the logit vector of the first set of RoBERTa predictions) in the conversation history.

The second type of experts utilized may be engagement-based, which may be configured to encourage user's participation in the conversation. One candidate can be a question expert, which can be utilized to provide a bot that is appropriately inquisitive to demonstrate the system's attentiveness to users, and thereby also increases user's responsiveness. To characterize whether a bot utterance is linked to a question, the systems and methods may define the label function $\ell_{question}(Y)$ which outputs 1 when both a question word and a question mark are present and 0 otherwise. Another engagement skill of interest can be exploration (i.e., the expert is able to change the tone or topic of conversations to avoid having a stale conversation). To measure the amount of exploration, in the label function $\ell_{exp}(X, Y)$, the systems and methods may utilize a sentence encoder to encode both the conversation history and the bot utterance and output the negative cosine similarity between these two embeddings.

For experiment 3, the reward for RL-based dialogue management can be defined as $$r(X, a, X_+) = \lambda_1 \ell_{sent}(X_+) + \lambda_2 \left( \ell_{sent}(X_+) - \frac{1-\gamma}{1-\gamma^L} \sum_{l=0}^{L-1} \gamma^l \ell_{sent}(X_l) \right),$$

where the linear combination weights $(\lambda_1, \lambda_2)=(0.75, 0.25)$ correlate with (Ghandeharioun et al., "Approximating interactive human evaluation with self-play for open-domain dialog systems," ADVANCES IN NEURAL INFORMATION PROCESSING SYSTEMS, 32, 2019.), and $\ell_{sent}(X)$ may be the same RoBerTa-based sentiment labeler as in experiment 2, which assigns a score from [−1,1] that is proportional to the positive sentiment and inversely proportional to the negative sentiment prediction probabilities. $\lambda_1$ may assign weight to sentiment-based score of the next user response $X_+$. $\lambda_2$ assigns weight to transition of user sentiment, which the system may define as the difference between sentiment-based score of next user response and discounted sentiment-based score of the current conversation.

The systems and methods may include a mixture-of-expert (MoE) approach for RL-based dialogue management (DM). The MoE language model (MoE-LM) can include three components: (i) a LM that can generate diverse semantics for conversation histories, (ii) a number of specialized LMs (or experts) that can produce utterances corresponding to a particular attribute or intent, and (iii) a RL-based DM that performs dialogue planning with the utterances generated by the experts.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining input data, wherein the input data comprises conversation data descriptive of a conversation;
processing the input data with an encoder model to generate a language representation, wherein the language representation comprises a latent embedding associated with the conversation, wherein the encoder model was trained to map an encoded conversation into a latent distribution;
processing the language representation with a plurality of machine-learned language models to generate a plurality of candidate outputs, wherein the plurality of candidate outputs comprise a plurality of candidate utterances, wherein the plurality of machine-learned language models were trained based on:
determining a plurality of learned sentiment distributions associated with a latent embedding space by sampling embeddings from the latent embedding space;
classifying outputs of processing the sampled embeddings;
training the plurality of machine-learned language models by selecting training examples from a specific learned sentiment distribution to generate an expert associated with that particular learned sentiment distribution, wherein the plurality of machine-learned language models comprises a first expert language model trained on training examples sampled from a first learned sentiment distribution, a second expert language model trained on training examples sampled from a second learned sentiment distribution, and a third expert language model trained on training examples sampled from a third learned sentiment distribution;
processing the plurality of candidate outputs and the language representation with a dialogue management model to generate dialogue planning data; and
generating a predicted dialogue response based on the dialogue planning data, wherein the predicted dialogue response comprises one or more predicted words associated with one or more candidate utterances of the plurality of candidate utterances.

2. The system of claim 1, wherein processing the language representation with the plurality of machine-learned language models to generate the plurality of candidate outputs comprises:
   processing the language representation with a plurality of expert language models to generate the plurality of candidate outputs, wherein the plurality of candidate outputs are associated with the plurality of candidate utterances; and
   wherein the predicted dialogue response comprises a selected candidate utterance associated with a selected candidate output of the plurality of candidate outputs, and wherein the selected candidate output is selected by the dialogue management model.

3. The system of claim 1, wherein the plurality of machine-learned language models comprises an expert language model trained on a particular skill such that the one or more candidate utterances are indicative of the particular skill.

4. The system of claim 1, wherein the dialogue management model was trained with reinforcement learning, wherein the reinforcement learning optimizes prediction for full conversations; and
   wherein the predicted dialogue response comprises a predicted utterance, and wherein the predicted utterance is responsive to the input data.

5. The system of claim 1, wherein the language representation is descriptive of semantics of a conversation history of the conversation, wherein the conversation history comprises a plurality of text strings exchanged.

6. The system of claim 1, wherein the language representation is associated with a latent space distribution of a learned latent space.

7. The system of claim 1, wherein the language representation is associated with a learned distribution of a latent space, wherein the learned distribution is associated with a particular sentiment.

8. The system of claim 1, wherein the dialogue management model is configured to:
   determine a conversation intent based on the language representation; and
   select a particular candidate output based on the particular candidate output being associated with the conversation intent.

9. A computer-implemented method, the method comprising:
   obtaining, by a computing system comprising one or more processors, conversation data, wherein the conversation data is descriptive of a conversation history;
   processing, by the computing system, the conversation data with a language encoding model to generate a language representation, wherein the language representation is descriptive of semantics associated with the conversation history;
   processing, by the computing system, the language representation with a plurality of machine-learned language models to generate a plurality of candidate outputs, wherein the plurality of machine-learned language models were trained based on:
       determining a plurality of learned sentiment distributions associated with a latent embedding space by sampling embeddings from the latent embedding space;
       classifying outputs of processing the sampled embeddings;
       training the plurality of machine-learned language models by selecting training examples from a specific learned sentiment distribution to generate an expert associated with that particular learned sentiment distribution, wherein the plurality of machine-learned language models comprises a first expert language model trained on training examples sampled from a first learned sentiment distribution, a second expert language model trained on training examples sampled from a second learned sentiment distribution, and a third expert language model trained on training examples sampled from a third learned sentiment distribution; and
   processing, by the computing system, the language representation and the plurality of candidate outputs with a dialogue management model to determine a dialogue response.

10. The method of claim 9, wherein a first machine-learned language model of the plurality of machine-learned language models was trained for a first skill, and wherein a second machine-learned language model of the plurality of machine-learned language models was trained for a second skill.

11. The method of claim 9, wherein the dialogue management model was trained to select a particular candidate output of the plurality of candidate outputs based at least in part on the language representation, and wherein the plurality of machine-learned language models were trained with ground truth training data.

12. The method of claim 9, wherein the language encoding model comprises a stochastic encoder model, wherein the stochastic encoder model comprises an encoder and a latent space distribution, and wherein the stochastic encoder model maps a tokenized conversation history to a latent space to generate a parameterized gaussian distribution.

13. The method of claim 9, wherein the plurality of machine-learned language models comprise a plurality of expert models associated with a plurality of emotions.

14. The method of claim 9, wherein the plurality of machine-learned language models comprise a plurality of expert models associated with a plurality of tasks.

15. One or more non-transitory computer-readable media that collectively store instructions that, when executed by one or more computing devices, cause the one or more computing devices to perform operations, the operations comprising:
   obtaining training data, wherein the training data comprises training conversation data;
   processing the training conversation data with a language encoding model to generate a language representation;
   processing the language representation with a plurality of machine-learned language models to generate a plurality of candidate utterances, wherein the plurality of machine-learned language models were trained based on:
       determining a plurality of learned sentiment distributions associated with a latent embedding space by sampling embeddings from the latent embedding space;
       classifying outputs of processing the sampled embeddings;
       training the plurality of machine-learned language models by selecting training examples from a specific learned sentiment distribution to generate an expert associated with that particular learned sentiment distribution, wherein the plurality of machine-learned language models comprises a first expert language model trained on training examples sampled from a first learned sentiment distribution, a second expert language model trained on training examples sampled from a second learned sentiment distribution, and a third expert language model trained on training examples sampled from a third learned sentiment distribution;

processing the plurality of candidate utterances with a dialogue management model to determine a predicted dialogue response;

providing the predicted dialogue response to a user computing system;

receiving additional conversation data from the user computing system, wherein the additional conversation data is descriptive of a conversation occurring after the predicted dialogue response; and adjusting one or more parameters of the dialogue management model based on the additional conversation data.

16. The one or more non-transitory computer-readable media of claim 15, wherein the operations further comprise:

determining satisfaction data based at least in part on the additional conversation data, wherein the satisfaction data is descriptive of a level of satisfaction with the predicted dialogue response, wherein the satisfaction data is determined based at least in part on conversation engagement; and adjusting one or more parameters of the dialogue management model based on the satisfaction data.

17. The one or more non-transitory computer-readable media of claim 15, wherein the training data comprises one or more ground truth utterances, and wherein the operations further comprise:

evaluating a loss function that evaluates a difference between a particular candidate utterance of the plurality of candidate utterances and the one or more ground truth utterances; and adjusting one or more parameters of at least one of the plurality of machine-learned language models based at least in part on the loss function.

18. The one or more non-transitory computer-readable media of claim 15, wherein the language encoding model comprises a variational autoencoder model.

19. The one or more non-transitory computer-readable media of claim 15, wherein the plurality of machine-learned language models comprise a plurality of language decoder models.

20. The one or more non-transitory computer-readable media of claim 15, wherein the language representation comprises a sequence of embeddings.

21. A computing system, the system comprising:
one or more processors; and
one or more non-transitory computer-readable media that collectively store instructions that, when executed by the one or more processors, cause the computing system to perform operations, the operations comprising:

obtaining sequence data, wherein the sequence data is descriptive of a sequence;

processing the sequence data with an encoding model to generate an encoding representation, wherein the encoding representation is descriptive of determined semantics of the sequence;

processing the encoding representation with a plurality of machine-learned expert models to generate a plurality of candidate outputs, wherein the plurality of machine-learned expert models are associated with a plurality of different intents, and wherein the plurality of machine-learned expert models process the encoding representation in parallel, wherein the plurality of machine-learned expert models were trained based on:

determining a plurality of learned sentiment distributions associated with a latent embedding space by sampling embeddings from the latent embedding space;

classifying outputs of processing the sampled embeddings;

training the plurality of machine-learned expert models by selecting training examples from a specific learned sentiment distribution to generate an expert associated with that particular learned sentiment distribution, wherein the plurality of machine-learned expert models comprises a first expert model trained on training examples sampled from a first learned sentiment distribution, a second expert model trained on training examples sampled from a second learned sentiment distribution, and a third expert model trained on training examples sampled from a third learned sentiment distribution;

processing the plurality of candidate outputs and the encoding representation with a management model to generate planning data; and generating a predicted output based on the planning data, wherein the predicted output comprises at least a portion of one or more candidate outputs of the plurality of candidate outputs.

* * * * *